(12) United States Patent
Austrheim et al.

(10) Patent No.: US 12,283,137 B2
(45) Date of Patent: Apr. 22, 2025

(54) SYSTEM, METHOD AND MAIN CONTROL SYSTEM FOR HANDLING MALFUNCTIONING VEHICLES IN AN AUTOMATED STORAGE AND RETRIEVAL SYSTEM COMPRISING A RAIL SYSTEM

(71) Applicant: Autostore Technology AS, Nedre Vats (NO)

(72) Inventors: Trond Austrheim, Etne (NO); Ivar Fjeldheim, Haugesund (NO)

(73) Assignee: AutoStore Technology AS, Nedre Vats (NO)

( * ) Notice: Subject to any disclaimer, the term of this patent is extended or adjusted under 35 U.S.C. 154(b) by 243 days.

(21) Appl. No.: 17/770,884

(22) PCT Filed: Oct. 13, 2020

(86) PCT No.: PCT/EP2020/078729
§ 371 (c)(1),
(2) Date: Apr. 21, 2022

(87) PCT Pub. No.: WO2021/078582
PCT Pub. Date: Apr. 29, 2021

(65) Prior Publication Data
US 2022/0392273 A1  Dec. 8, 2022

(30) Foreign Application Priority Data
Oct. 23, 2019  (NO) .................................. 20191265

(51) Int. Cl.
*G07C 5/00* (2006.01)
*G07C 5/08* (2006.01)
(52) U.S. Cl.
CPC ........... *G07C 5/008* (2013.01); *G07C 5/0816* (2013.01)

(58) Field of Classification Search
CPC .......... G07C 5/008; B65G 1/0464; B25J 5/02; G05D 1/0027; H04W 28/02
See application file for complete search history.

(56) References Cited

U.S. PATENT DOCUMENTS

| 2012/0152877 A1 | 6/2012 | Tadayon |
| 2017/0206721 A1* | 7/2017 | Koo .......................... G01S 5/16 |

(Continued)

FOREIGN PATENT DOCUMENTS

| JP | 2012243291 A | 10/2012 |
| JP | 2017509564 A | 4/2017 |

(Continued)

OTHER PUBLICATIONS

International Search Report and Written Opinion issued in International Application No. PCT/EP2020/078729 mailed on Feb. 1, 2021 (14 pages).

(Continued)

*Primary Examiner* — Khoi H Tran
*Assistant Examiner* — Dairon Estevez
(74) *Attorney, Agent, or Firm* — Baker Botts L.L.P.

(57) ABSTRACT

An automated storage and retrieval system includes a rail system with perpendicular tracks in X and Y direction. The storage and retrieval system includes a plurality of remotely operated container handling vehicles configured to move laterally on the rail system; and a main control system using a first communication system for communicating with the plurality of remotely operated container handling vehicles. The main control system monitors and controls the movement of the plurality of container handling vehicles via the first communication system. At least one service vehicle is movable on the rail system. The at least one service vehicle is configured to bring a malfunctioning remotely operated container handling vehicle to a service area outside of the (Continued)

rail system where the remotely operated container handling vehicles operate. The system further includes a secondary control system using a second communication system. The second communication system is independent of the main communication system. The secondary control system is communicating with the at least one service vehicle on the rail system such as to monitor and control the movement of the at least one service vehicle.

17 Claims, 21 Drawing Sheets

(56) References Cited

U.S. PATENT DOCUMENTS

| | | | | |
|---|---|---|---|---|
| 2017/0223712 | A1* | 8/2017 | Stephens | H04W 4/90 |
| 2017/0249817 | A1* | 8/2017 | Nassar | G06T 7/70 |
| 2018/0194571 | A1* | 7/2018 | Fryer | B65G 45/10 |
| 2018/0208397 | A1* | 7/2018 | Schack | B65G 1/04 |
| 2019/0176323 | A1* | 6/2019 | Coady | B65G 1/0421 |
| 2019/0286164 | A1* | 9/2019 | Skaaksrud | G08G 1/202 |

FOREIGN PATENT DOCUMENTS

| | | |
|---|---|---|
| NO | 317366 B1 | 10/2004 |
| WO | 2014075937 A1 | 5/2014 |
| WO | 2014090684 A1 | 6/2014 |
| WO | 2015140216 A1 | 9/2015 |
| WO | 2015185726 A2 | 12/2015 |
| WO | 2015193278 A1 | 12/2015 |
| WO | 2019233632 A1 | 12/2019 |
| WO | 2019238662 A1 | 12/2019 |
| WO | 2020151866 A1 | 7/2020 |

OTHER PUBLICATIONS

Norwegian Search Report issued in Application No. 20191265 mailed on May 18, 2020 (2 pages).

Takako Ohtsuka, Notice of Reasons for Rejection for Japanese Patent Application No. 2022523598, mailed Aug. 30, 2024, 24 pages, pub. by JPO.

Coquau, Stephane, Office Action for European Patent Application No. 20790283.4, dated Jun. 4, 2024, 5 pages, published by the European Patent Office, Rijswijk, Netherlands.

Liu Jing, Second Office Action for Chinese Patent Application No. CN2020800748834, dated Dec. 4, 2024, 11 pages, pub. by SIPO, Beijing, China.

* cited by examiner

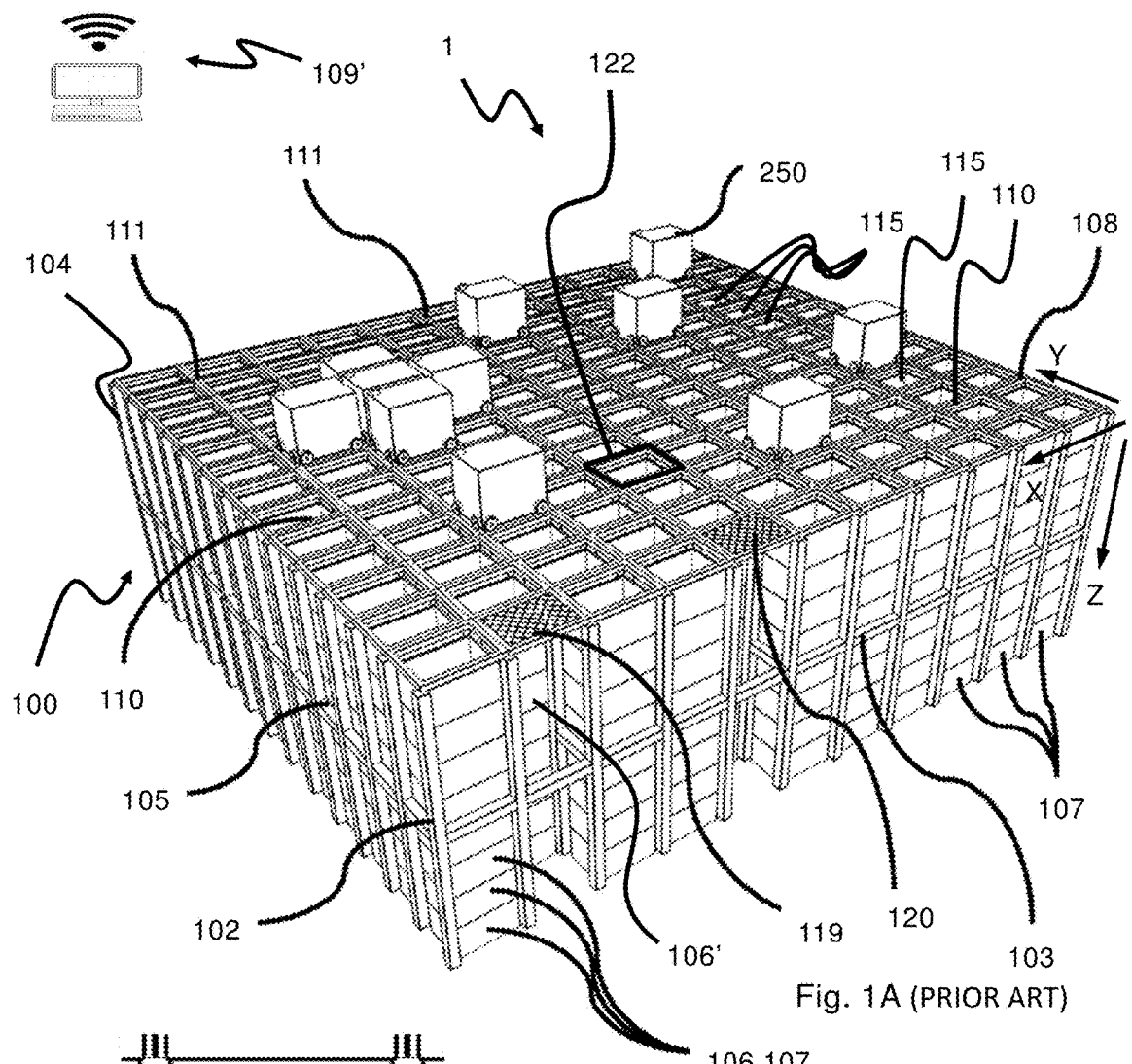
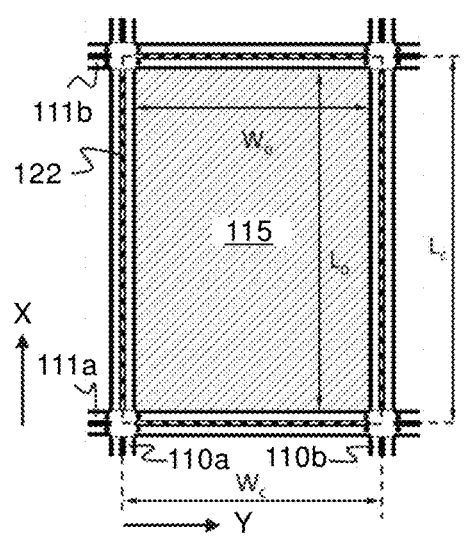
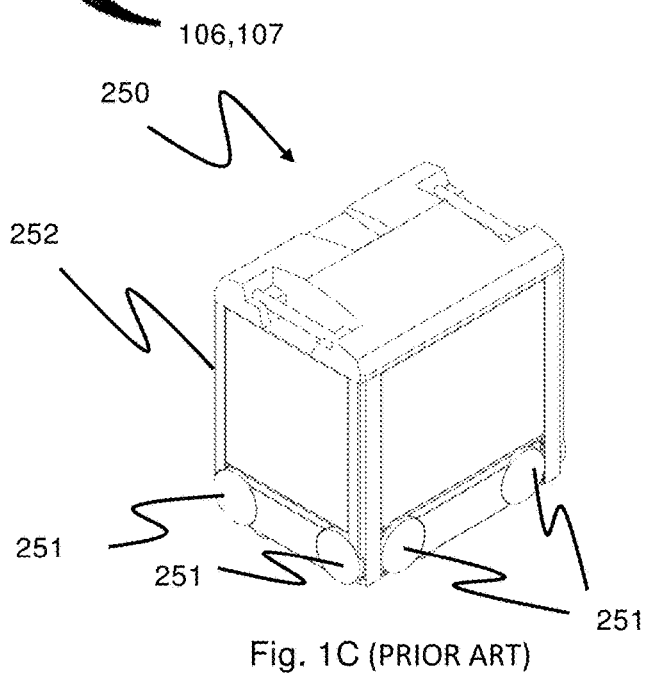
Fig. 1A (PRIOR ART)
Fig. 1B (PRIOR ART)
Fig. 1C (PRIOR ART)

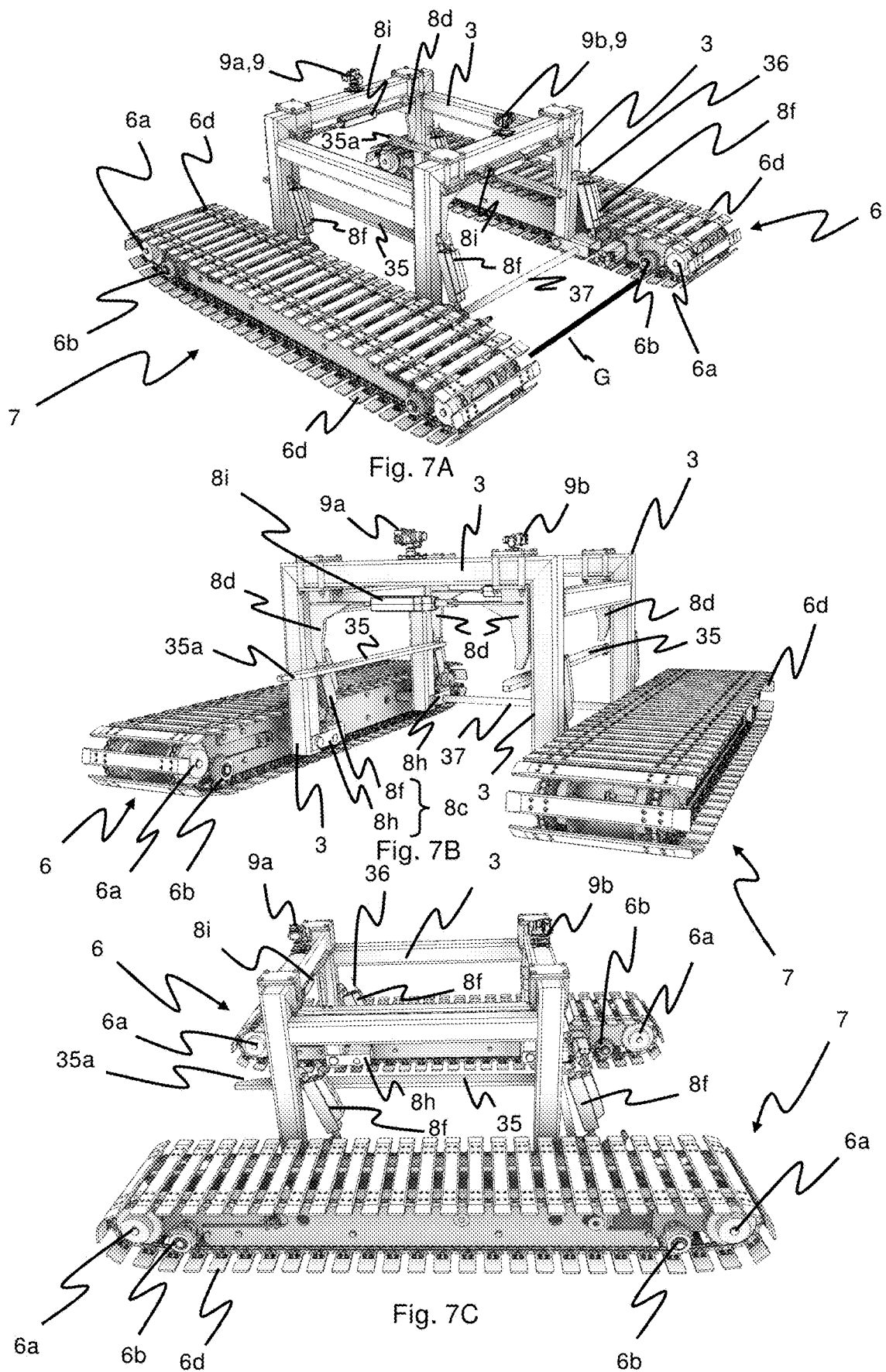

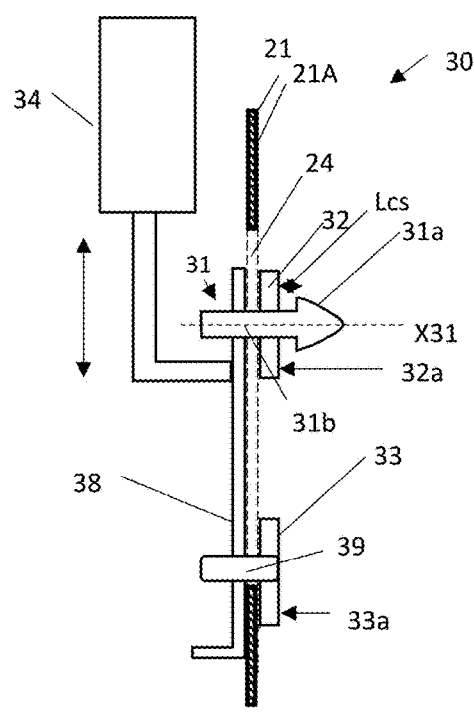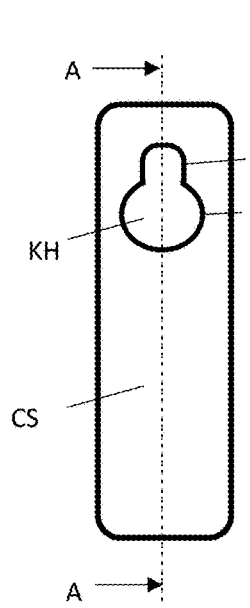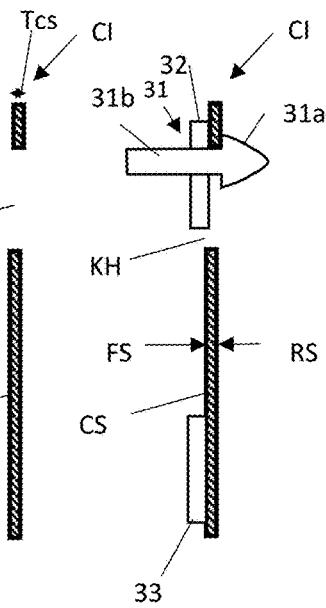
Fig. 19A    Fig. 19B    Fig. 19C    Fig. 19D

SYSTEM, METHOD AND MAIN CONTROL SYSTEM FOR HANDLING MALFUNCTIONING VEHICLES IN AN AUTOMATED STORAGE AND RETRIEVAL SYSTEM COMPRISING A RAIL SYSTEM

TECHNICAL FIELD

The present invention relates to a method for handling malfunctioning vehicles on a rail system constituting part of a storage and retrieval system configured to store a plurality of stacks of storage containers, a storage and retrieval system and a control system carrying out the method, and a main control system for an automated storage and retrieval system.

BACKGROUND AND PRIOR ART

FIG. 1A discloses a typical prior art automated storage and retrieval system 1 with a framework structure 100.

The framework structure 100 comprises a plurality of upright members 102 and optionally a plurality of horizontal members 103 supporting the upright members 102. The members 102, 103 may typically be made of metal, e.g. extruded aluminum profiles.

The framework structure 100 defines a storage grid 104 comprising storage columns 105 arranged in rows, in which storage columns 105 storage containers 106 (also known as bins) are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the storage containers 106 in the stacks 107, and guides vertical movement of the storage containers 106, but does normally not otherwise support the storage containers 106 when stacked.

The automated storage and retrieval system 1 comprises a rail system 108 arranged in a grid pattern across the top of the storage 104, on which rail system 108 a plurality of container handling vehicles 250 (as exemplified in FIG. 1C) are operated to raise storage containers 106 from, and lower storage containers 106 into, the storage columns 105, and also to transport the storage containers 106 above the storage columns 105. The horizontal extent of one of the grid cells 122 constituting the grid pattern is in FIG. 1A marked by thick lines.

The rail system 108 comprises a first set of parallel rails 110 arranged to guide movement of the container handling vehicles 250 in a first direction X across the top of the frame structure 100, and a second set of parallel rails 111 arranged perpendicular to the first set of rails 110 to guide movement of the container handling vehicles 250 in a second direction Y which is perpendicular to the first direction X. In this way, the rail system 108 defines grid columns above which the container handling vehicles 250 can move laterally above the storage columns 105, i.e. in a plane which is parallel to the horizontal X-Y plane.

The rail system 108 may be a single rail system or a double rail system as is shown in FIG. 1B. The latter rail configuration allows a container handling vehicle 250 having a footprint generally corresponding to the lateral area defined by a grid cell 122 to travel along a row of grid columns even if another container handling vehicle 250 is positioned above a grid cell neighboring that row. Both the single and double rail system, or a combination comprising a single and double rail arrangement in a single rail system 108, forms a grid pattern in the horizontal plane P comprising a plurality of rectangular and uniform grid locations or grid cells 122, where each grid cell 122 comprises a grid opening 115 being delimited by a pair of neighboring rails 110a,110b of the first set of rails 110 and a pair of neighboring rails 111a,111b of the second set of rails 111.

Consequently, rails 110a and 110b form pairs of rails defining parallel rows of grid cells running in the X direction, and rails 111a and 111b form pairs of rails defining parallel rows of grid cells running in the Y direction.

As shown in FIG. 1B, each grid cell 122 (indicated by a dashed box) has a width $W_c$ which is typically within the interval of 30 to 150 cm, and a length $L_c$ which is typically within the interval of 50 to 200 cm. Each grid opening 115 has a width $W_o$ and a length $L_o$ which is typically 2 to 10 cm less than the width $W_c$ and the length $L_c$ of the grid cell 122.

FIG. 1C discloses a prior art container handling vehicle 250 operating the system 1 disclosed in FIG. 1A. Each prior art container handling vehicle 250 comprises a vehicle body 252 and a wheel arrangement 251 of eight wheels, where a first set of four wheels enable the lateral movement of the container handling vehicles 250 in the X direction and a second set of the remaining four wheels enable the lateral movement in the Y direction. One or both sets of wheels in the wheel arrangement 251 can be lifted and lowered, so that the first set of wheels and/or the second set of wheels can be engaged with the respective set of rails 110, 111 at any one time.

Each prior art container handling vehicle 250 also comprises a lifting device (not shown) for vertical transportation of storage containers 106, e.g. raising a storage container 106 from, and lowering a storage container 106 into, a storage column 105. The lifting device may comprise one or more gripping/engaging devices which are adapted to engage a storage container 106, and which gripping/engaging devices can be lowered from the vehicle 250 so that the position of the gripping/engaging devices with respect to the vehicle can be adjusted in a third direction Z which is orthogonal the first direction X and the second direction Y.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the exemplary prior art grid 104 disclosed in FIG. 1A, Z=8 identifies the lowermost, bottom layer of the grid 104. Consequently, as an example, and using the Cartesian coordinate system X, Y, Z indicated in FIG. 1A, the storage container identified as 106' in FIG. 1A can be said to occupy grid location or cell X=10, Y=2, Z=3. The container handling vehicles 250 can be said to travel in layer Z=0 and each grid column can be identified by its X and Y coordinates.

Each container handling vehicle 250 comprises a storage compartment or space (not shown) for receiving and stowing a storage container 106 when transporting the storage container 106 across the rail system 108. The storage space may comprise a cavity arranged centrally within the vehicle body 252, e.g. as is described in WO2014/090684A1, the contents of which are incorporated herein by reference.

The container handling vehicles 250 may have a footprint, i.e. an extent in the X and Y directions, which is generally equal to the lateral extent of a grid cell 122, i.e. the extent of a grid cell 122 in the X and Y directions, e.g. as is described in WO2015/193278A1, the contents of which are incorporated herein by reference. The term "lateral" used herein may mean "horizontal".

Alternatively, the container handling vehicles may have a footprint which is larger than the lateral extent of (lateral area defined by) a grid column 105, e.g. as is disclosed in WO2014/090684A1.

In the X and Y directions, neighboring grid cells are arranged in contact with each other such that there is no space there-between.

In a storage grid 104, a majority of the grid columns are storage columns 105, i.e. grid columns 105 where storage containers 106 are stored in stacks 107. However, a grid 104 normally has at least one grid column which is used not for storing storage containers 106, but which comprises a location where the container handling vehicles 250 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column in which the port is located may be referred to as a "delivery column" 119,120. The drop-off and pick-up ports of the container handling vehicles are referred to as the "upper ports of a delivery column" 119,120. While the opposite end of the delivery column is referred to as the "lower ports of a delivery column".

The storage grid 104 in FIG. 1A comprises two delivery columns 119 and 120. The first delivery column 119 may for example comprise a dedicated drop-off port where the container handling vehicles 250 can drop off storage containers 106 to be transported through the delivery column 119 and further to an access or a transfer station, and the second delivery column 120 may comprise a dedicated pick-up port where the container handling vehicles 250 can pick up storage containers 106 that have been transported through the delivery column 120 from an access or a transfer station. Each of the ports of the first and second delivery column may comprise a port suitable for both pick up and drop of storage containers.

The second location may typically be a picking or a stocking station where product items are removed from or positioned into the storage containers 106. In a picking or a stocking station, the storage containers 106 are normally never removed from the automated storage and retrieval system 1 but are returned into the storage grid 104 once accessed. For transfer of storage containers out or into the storage grid 104, there are also lower ports provided in a delivery column, such lower ports are e.g. for transferring storage containers 106 to another storage facility (e.g. to another storage grid), directly to a transport vehicle (e.g. a train or a lorry), or to a production facility.

A conveyor system may also be arranged to transfer storage containers between different storage grids, e.g. as is described in WO2014/075937A1, the contents of which are incorporated herein by reference.

When a storage container 106 stored in the storage grid 104 disclosed in FIG. 1A is to be accessed, one of the container handling vehicles 250 is instructed to retrieve the target storage container 106 from its position in the grid 104 and transport it to or through the transfer column 119. This operation involves moving the container handling vehicle 250 to a grid location above the storage column 105 in which the target storage container 106 is positioned, retrieving the storage container 106 from the storage column 105 using the container handling vehicle's lifting device (not shown), and transporting the storage container 106 to the transfer column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 250 that is subsequently used for transporting the target storage container 106 to the transfer column, or with one or a plurality of other cooperating container handling vehicles 250. Alternatively, or in addition, the automated storage and retrieval system 1 may have container handling vehicles specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 250 is instructed to pick up the storage container 106 from the transfer column 120 and to transport it to a grid location above the storage column 105 where it is to be stored. After any storage containers positioned at or above the target position within the storage column stack 107 have been removed, the container handling vehicle 250 positions the storage container 106 at the desired position. The removed storage containers may then be lowered back into the storage column 105 or relocated to other storage columns 105.

For monitoring and controlling the automated storage and retrieval system 1 so that a desired storage container 106 can be delivered to the desired location at the desired time without the container handling vehicles 250 colliding with each other, the automated storage and retrieval system 1 comprises a control system 109, which typically is computerized and comprises a database for monitoring and controlling e.g. the location of the respective storage containers 106 within the storage grid 104, the content of each storage container 106 and the movement of the container handling vehicles 250.

A problem associated with known automated storage and retrieval systems 1 is that it is challenging for personnel to access the rail system 108 for carrying out inspection, or to carry out maintenance of or to remove malfunctioning container handling vehicles 250.

Another important problem with maintenance or removal of malfunctioning vehicles 250 is that a complete shutdown of the system 1 is needed for the personnel to access with low or zero risk of injury. In particular for large systems 1, for example systems 1 with in excess of 500 vehicles in operation simultaneously, a complete shutdown is highly undesired due to significant cost for the operator.

Prior art includes WO2015/140216 A1 disclosing a service robot which operates under the same control system as the container robots. WO2015/140216A1 discloses a service vehicle for cleaning the grid and for inspection of the grid. The service vehicle is arranged with a releasable latching mechanism for docking with a malfunctioning container handling vehicle. In addition, the publication suggests that the service vehicle may be arranged with a seat for carrying a user to inspect and carry out maintenance. This personnel carrying version of the service vehicle may be manually operated by the user, or alternatively remotely controlled by the control system.

For these operations to happen safely it is necessary to stop all container handling vehicles on the grid before the user is allowed access. The higher the number of robotic load handlers in use and the larger the grid, the higher the likelihood of faults occurring and an increased consequence of each fault, due to the number of units which have to be stopped.

It is an objective of the invention to provide a malfunctioning container handling vehicle without shutting down the system.

SUMMARY OF THE INVENTION

The present invention is set forth and characterized in the independent claims, while the dependent claims describe other characteristics of the invention.

It is described an automated storage and retrieval system comprising a rail system with perpendicular tracks in X and Y direction, wherein the storage and retrieval system comprises:
 a plurality of remotely operated container handling vehicles configured to move laterally on the rail system; and
 a main control system using a first communication system for communicating with the plurality of remotely operated container handling vehicles; wherein the main control system monitors and controls the movement of the plurality of container handling vehicles via the first communication system;
 at least one service vehicle movable on the rail system, wherein the at least one service vehicle is configured to bring a malfunctioning remotely operated container handling vehicle to a service area outside of the rail system where the remotely operated container handling vehicles operate;
wherein the system further comprises:
 a second control system using a second communication system, wherein the second communication system is independent of the main communication system, and wherein the secondary control system is communicating with the at least one service vehicle on the rail system such as to monitor and control the movement of the at least one service vehicle.

The main control system may thus monitor and control the movement of the plurality of container handling vehicles via the first communication system.

The second control system may thus monitor and control the movement of the at least one service vehicle via the second communication system.

The term independent, i.e. that the second communication system is independent of the first communication system, shall be understood as the two communication systems which cannot interfere with one another. However, the main control system and secondary control system may operate under a same master controller.

Both the first communication system and the second communication system preferably operate using wireless communication.

In an aspect, the main control system may be configured to perform, by wireless data communication, at least the following steps:
 A. determining an anomaly in an operational condition of a vehicle on the rail system,
 B. registering the vehicle with the anomalous operational condition as a malfunctioning vehicle,
 C. registering a position of the malfunctioning vehicle relative to the supporting rail system.

A malfunctioning vehicle may be a vehicle which is partly malfunctioning or a vehicle which is not functioning at all. A vehicle not functioning at all may e.g. have completely stopped and/or communication with the first communication system may have been interrupted for some reason.

The main control system is further configured to perform:
 D. setting up a two-dimensional exclusion zone extending from the malfunctioning vehicle to a position of the service vehicle.

The exclusion zone may be set up along the shortest route to the malfunction vehicle. Alternatively, the exclusion zone may not be the shortest route but selected based on other parameters. For example, the exclusion zone may be along a perimeter of the rail system, e.g., to maintain an as large as possible and an as effective as possible working area for the vehicles to operate in. In other words, the exclusion zone might take up more overall area of the working area but that might still result in more efficient operation.

The main control system may further be configured to perform:
 E. updating a movement pattern of the plurality of remotely operated vehicles by instructing any remotely operated vehicles positioned within the two-dimensional exclusion zone to move outside of the two-dimensional exclusion zone and avoiding entry of any of the remaining remotely operated vehicles into the two-dimensional exclusion zone.

Therefore, the remotely operated vehicles that are currently in the exclusion zone when the main control system updates the movement pattern and sets up an exclusion zone, are routed to a position outside the exclusion zone. Such re-routing of the remotely operated vehicles ensure that remotely operated vehicles do not represent obstacles to the service vehicle. It also allows these remotely operated vehicles to perform container handling operations whilst the exclusion zone is in effect. In other words, any remotely operated vehicle currently in grid cells that are to form part of an exclusion zone are re-rerouted to grid cells outside of the planned exclusion zone. Therefore, the remotely operated vehicles will need to be identified and moved out of the way before the occupied cells forms part of a planned exclusion zone.

When the main control system has performed the above steps, the secondary control system may be configured to perform, by wireless data communication, at least the following step:
 F. operating the at least one service vehicle to move from an initial position to a position next to the malfunctioning vehicle along the exclusion zone.

The first communication system and the second communication system may be the same communication system or different communication systems. Such communication system may include WiFi, light (e.g. Lifi) etc.

The first communication system and the second communication system may operate with different frequencies.

The first communication system and the second communication system may have different coding and de-coding processes.

For example, the first communication system is wireless fidelity (WiFi) and the second communication system is light fidelity (LiFi).

The second communication system maybe automatically or manually operated. In the event of manual operation, an operator may remotely control the service vehicle along the exclusion zone using a remote control or similar.

The service vehicle may comprise wheels which are guided for movement along the rails in X and Y directions.

The service vehicle may comprise caterpillar tracks for movement over a top surface of the rail system independent of the X and Y directions of the rail system.

An initial position of the service vehicle may be in a service area outside of the rail system where the remotely operated vehicles operate.

If the service vehicle comprises wheels, the service area preferably comprises rails connected to the rail system.

In one embodiment, the rail system is at a top level of a storage grid.

In one embodiment, the rail system is a delivery rail system.

It is further described a method for handling malfunctioning vehicles on a rail system wherein the storage and retrieval system comprises:

a plurality of remotely operated container handling vehicles configured to move laterally on the rail system; and a main control system using a first communication system for communicating with the plurality of vehicles wirelessly, wherein the main control system monitors and controls the movement of the plurality of container handling vehicles via the first communication system;

at least one service vehicle positioned at an initial position, wherein the service vehicle is movable on the rail system, and wherein the at least one service vehicle is configured to bring a malfunctioning remotely operated container handling vehicle to a service area outside of the rail system where the remotely operated container handling vehicles operate;

a secondary control system, using a second communication system which is independent of the main control system for communicating with the at least one service vehicle on the rail system wirelessly, and wherein the secondary control system monitors and controls the movement of the at least one service vehicle; the main control system performs at least the following steps:

A. determining an anomaly in an operational condition of a vehicle on the rail system, B. registering the vehicle with the anomalous operational condition as a malfunctioning vehicle, C. registering a position of the malfunctioning vehicle relative to the supporting rail system.

The method may further comprise utilizing the main control system to perform:

D. setting up a two-dimensional exclusion zone extending from the malfunctioning vehicle to the position of the service vehicle.

The method may further comprise utilizing the main control system to perform:

E. updating movement pattern of the plurality of remotely operated vehicles outside the two-dimensional exclusion zone such that entrance into the two-dimensional exclusion zone is avoided.

The method may further comprise, when the main control system has performed the above steps, the secondary control system performs by wireless data communication at least the following step:

F. operating the at least one service vehicle to move from its initial position to the position where the malfunctioning vehicle is halted along the exclusion zone.

It is further described a main control system for an automated storage and retrieval system, the automated storage and retrieval system comprising:

a rail system with horizontal tracks extending in perpendicular X and Y directions;

a plurality of remotely operated container handling vehicles configured to operate on the rail system;

a service vehicle; and a secondary control system for the service vehicle wherein the secondary control system is communicating with the at least one service vehicle on the rail system such as to monitor and control the movement of the at least one service vehicle, and wherein the at least one service vehicle is configured to bring a malfunctioning remotely operated container handling vehicle to a service area outside of the rail system where the remotely operated container handling vehicles operate, wherein the main control system is configured to route the plurality of remotely operated vehicles across a working zone of the rail system, the main control system further being configured to detect if a remotely operated vehicle is malfunctioning, and if it is, the main control system may be configured to:

reconfigure the working zone to divide off an exclusion zone, the exclusion zone defining an area of the rail system containing the malfunctioning remotely operated vehicle and providing a path for the service vehicle to reach the malfunctioning remotely operated vehicle;

reroute other remotely operated vehicles operating in the exclusion zone and in the reconfigured working zone so that they avoid the area of the rail system defined by the exclusion zone; and hand over control of the area of the rail system in the exclusion zone to the secondary control system.

In one aspect, the automated storage and retrieval system described above comprises the main control system described in the latter.

The main control system may be configured, once the service vehicle has moved out of the exclusion zone of the rail system, to:

take back control of the area of the rail system within the exclusion zone from the secondary control system;

reconfigure the working zone to include the area of the rail system that was previously in the exclusion zone; and reroute remotely operated vehicles to take account of the increased working zone with the area of the rail system previously in the exclusion zone included as part of the working zone.

BRIEF DESCRIPTION OF THE DRAWINGS

The following drawings are appended to facilitate the understanding of the invention:

FIG. 1 is a perspective view of a prior art automated storage and retrieval system, where FIG. 1A shows the complete system, FIG. 1B shows a top view of a prior art double rail grid and FIG. 1C shows an example of a system operable prior art container handling vehicle;

FIG. 3A shows a part of the system having a delivery rail system with container delivery vehicles operating below the rail system of container handling vehicles and FIG. 3B shows an example of a container delivery vehicle having a storage container stored within;

FIG. 6A shows a service vehicle having two set of wheels configured to follow the rails in X and Y directions and FIG. 6B shows a service vehicle having caterpillar tracks configured to drive on top of the rail system;

FIGS. 7A-C are perspective side views of a service vehicle being configured to be operated remotely;

FIG. 8A shows the service vehicle approaching a container handling vehicle to be serviced, FIG. 8 B shows the service vehicle partly surrounding the container handling vehicle and FIG. 8 C shows the service vehicle gripping the container handling vehicle by use of its handling mechanism;

FIG. 19A illustrates a cross sectional view of an exemplary connection system;

FIG. 19B illustrates a front view of the connection interface of FIG. 19A;

FIG. 19C illustrates a cross sectional view along line A-A in FIG. 19B;

FIG. 19D illustrates a cross sectional view of some parts of the connection system being in contact with the connection interface.

In the drawings, the same reference numerals have been used to indicate like parts, elements or features unless otherwise explicitly stated or implicitly understood from the context.

DETAILED DESCRIPTION OF THE INVENTION

Figure 2:
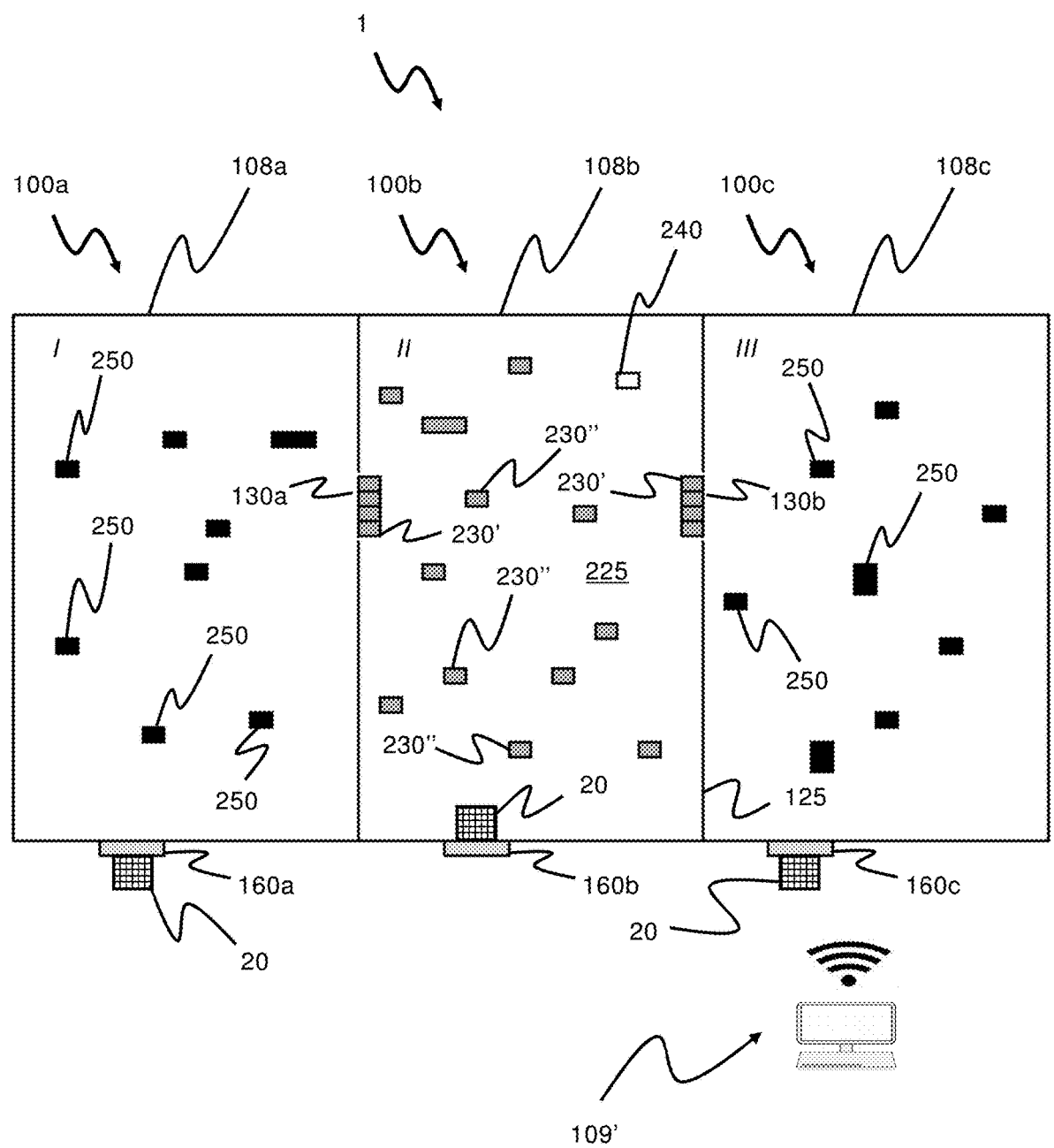
FIG. 2 is a schematic top view of an automated storage and retrieval system according to wherein the system is divided into three subsystems by physical barriers.

In the following, embodiments of the invention will be discussed in more detail with reference to the appended drawings. It should be understood, however, that the drawings are not intended to limit the invention to the subject-matter depicted in the drawings.

With reference to FIG. 1 the automated storage and retrieval system 1 comprises a framework structure 100 which includes a storage grid 104 of in total 1144 grid cells, where the width and length of the grid 104 corresponds to the width and length of 143 grid columns. The top layer of the framework structure 100 is a rail system 108 onto which a plurality of container handling vehicles 250 are operated.

The framework structure 100 may be constructed in accordance with the prior art framework structure 100 described above, i.e. a plurality of upright members 102 and a plurality of horizontal members 103 which are supported by the upright members 102.

The rail system 108 includes parallel rails 110,111 along the X direction and the Y direction, respectively, arranged across the top of storage columns 105. The horizontal area of a grid cell 122 delimiting the opening into the storage column 105 may be defined by the distance between adjacent rails 110 and 111, respectively.

In FIG. 1, a single grid cell 122 is marked on the rail system 108 by thick lines in FIG. 1A and shown in a top view in FIG. 1B.

The rail system 108 allows the container handling vehicles 250 to move horizontally between different grid locations, where each grid location is associated with a grid cell 122.

In FIG. 1A the storage grid 104 is shown with a height of eight cells. It is understood, however, that the storage grid 104 can in principle be of any size. In particular, It is understood that storage grid 104 can be considerably wider and/or longer than disclosed in FIG. 1. For example, the grid 104 may have a horizontal extension of more than 700×700 grid cells 122. Also, the grid 104 can be considerably deeper than disclosed in FIGS. 1 and 2. For example, the storage grid 104 may have a depth corresponding to a stable 107 of ten storage containers 106 or more.

All container handling vehicles 250 may be controlled by a main control system with a first communication system as indicated with reference numeral 109'.

The container handling vehicles 250 may be of any type known in the art, e.g. any one of the automated container handling vehicles disclosed in WO2014/090684 A1, in NO317366 or in WO2015/193278A1.

FIG. 2 shows a top view of an automated storage and retrieval system 1. The system 1 comprises three framework structures 100a-c, each having a storage grid 104 with stacks 107 of storage containers 106, a rail system 108a-c arranged on top of the storage grid 104 and a service area 160a-c. The framework structures 100a-c are separated by two vehicle blocking barriers 125, e.g., walls, arranged between the rail systems 108a-c. Each of the barriers 125 includes one or more passages 130a,b in which container handling vehicles 250 may drive through during normal operation.

In FIG. 2 a particular situation is depicted where a container handling vehicle 240 has been labeled malfunctional and brought to a halt at a location on the mid rail system 108b.

The service areas 160a-c may be adjacent to a mezzanine outside the boundary of the rail systems 108, for supporting the service vehicle 20 while it is inactive.

In FIG. 2, a service area 160a-c and a service vehicle 20 is depicted for each of the rail systems 108a-c. However, other configurations may be envisaged such as an arrangement of only one mid service area 160b, allowing entrance of a service vehicle 20 into the mid rail system 108b. In case a malfunctioning vehicle 240 is brought to a halt in the left rail system 108a or the right rail system 108c, the service vehicle 20 may, with such a configuration, travel through the respective passage 130a,b and into the affected rail system 108a,c.

Figure 3A:
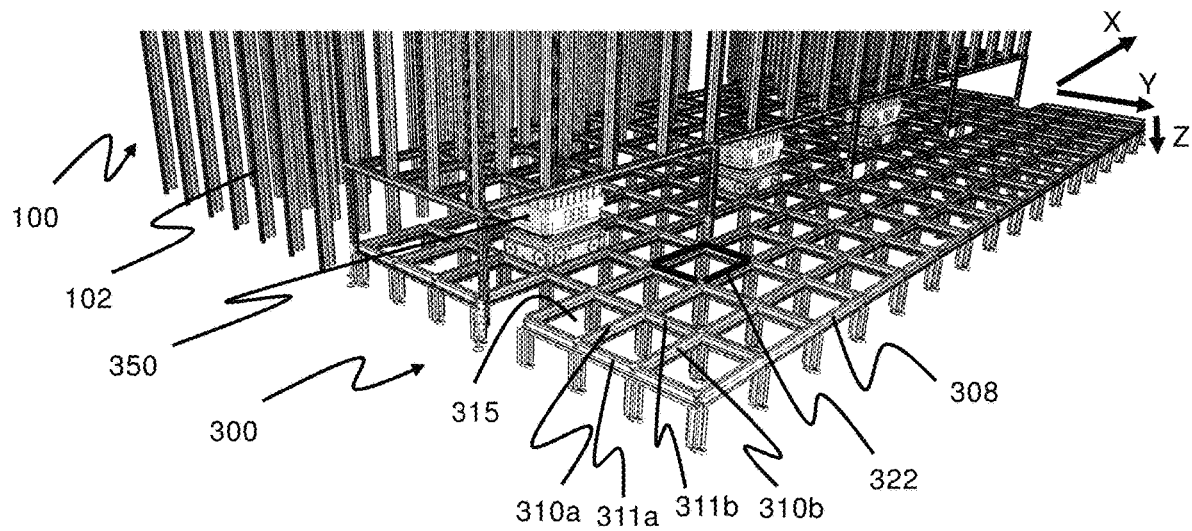
FIGS. 3A and 3B are perspective views of an exemplary automated storage and retrieval system according to the invention, where

A different automated storage and retrieval system 1 is shown in part in FIG. 3A. The upright members 102 constitute part of a framework structure 100 onto which a transport rail system 108 with a plurality of container handling vehicles 250 are operating.

Below this transport rail system 108, near the floor level, another framework structure 300 is shown which partly extends below some of the storage columns 105 of the framework structure 100. As for the other framework structure 100, a plurality of vehicles 330,340,350 may operate on a rail system 308 comprising a first set of parallel rails 310 directed in a first direction X and a second set of parallel rails 311 directed in a second direction Y perpendicular to the first direction X, thereby forming a grid pattern in the horizontal plane $P_L$ comprising a plurality of rectangular and uniform grid locations or grid cells 322. Each grid cell of this lower rail system 308 comprises a grid opening 315 being delimited by a pair of neighboring rails 310a,310b of the first set of rails 310 and a pair of neighboring rails 311a, 311b of the second set of rails 311.

The part of the lower rail system 308 that extends below the storage columns 105 are aligned such that its grid cells 322 are in the horizontal plane $P_L$ coincident with the grid cells 122 of the upper rail system 108 in the horizontal plane P.

Hence, with this particular alignment of the two rail systems 108,308, a storage container 106 being lowered down into a storage column 105 by a container handling vehicle 250 can be received by a delivery vehicle 350 configured to run on the rail system 308 and to receive storage containers 106 down from the storage column 105. In other words, the delivery vehicle 350 is configured to receive storage containers 106 from above, preferably directly from the container handling vehicle 250.

Figure 3B:
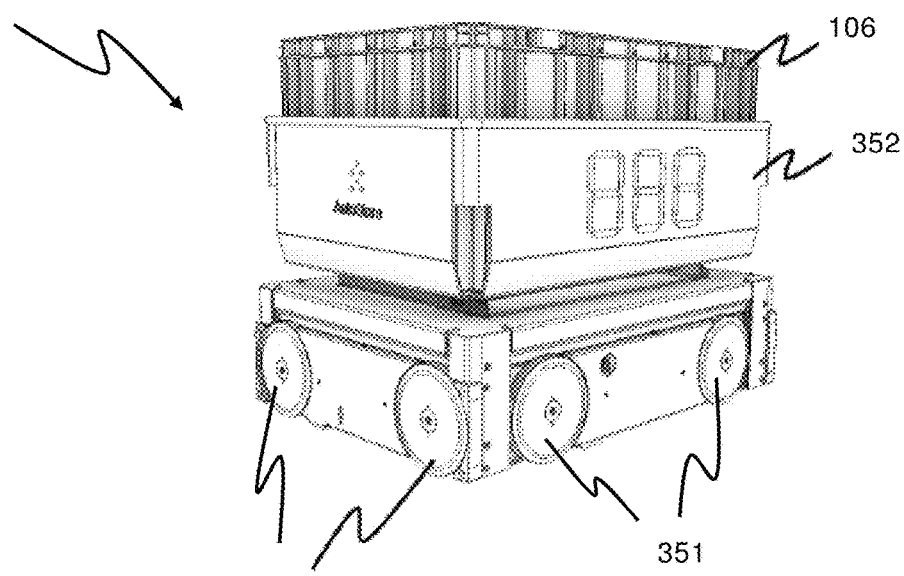

FIG. 3B shows an example of such a vehicle 350 comprising a wheel assembly 351 similar to the wheel assembly 251 described for the prior art container handling vehicle 250 and a storage container support 352 for receiving and supporting a storage container 106 delivered by an above container handling vehicle 250.

After having received a storage container 106, the delivery vehicle 350 may drive to an access station adjacent to the rail system 308 (not shown) for delivery of the storage container 106 for further handling and shipping.

Hereinafter, the upper and lower rail systems 108,308 are called the transport rail system 108 and the delivery rail system 308. Likewise, the vehicle shown in FIG. 3B is called a container delivery vehicle 350.

Figure 4:
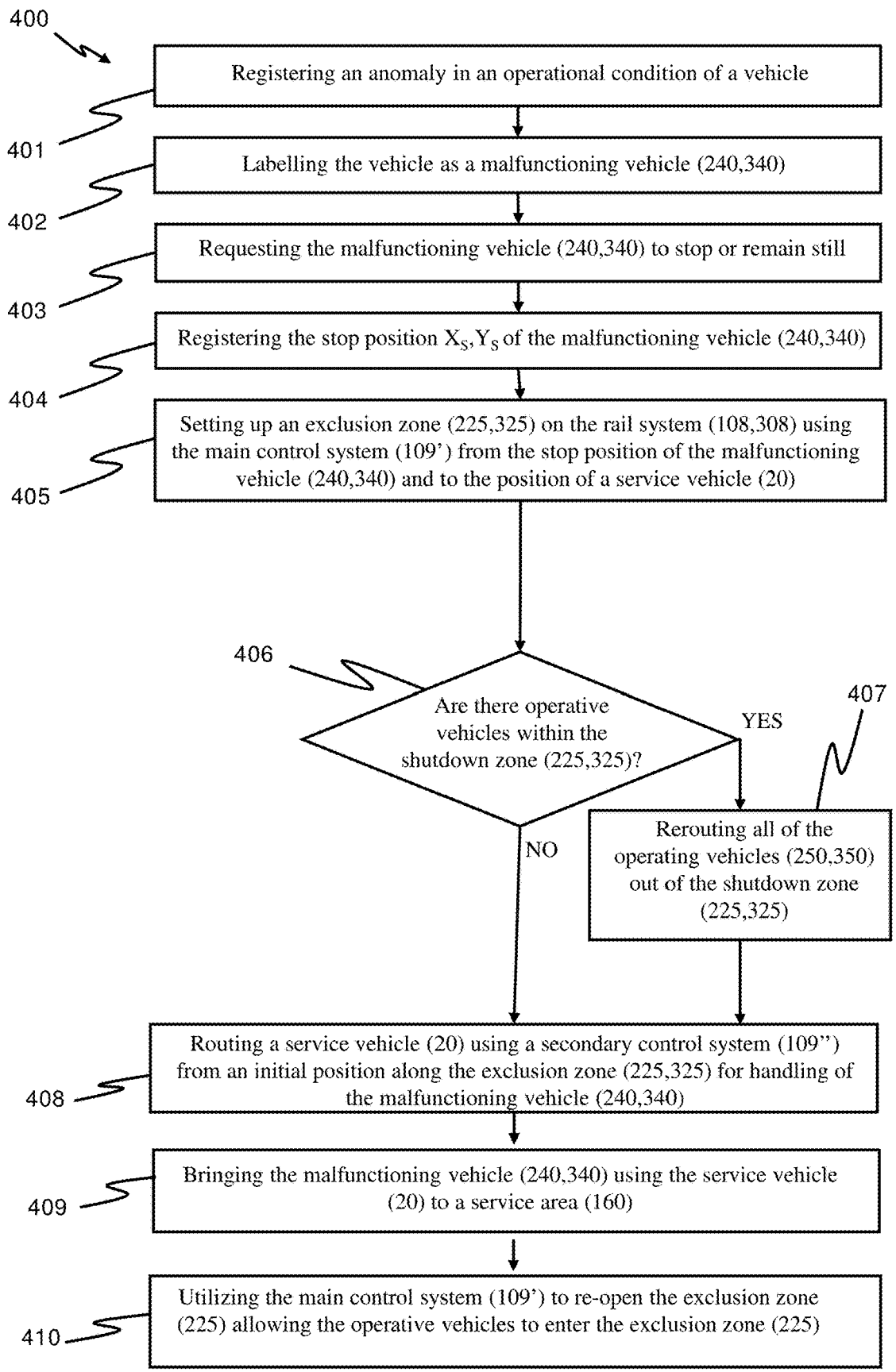
FIG. 4 shows a flow chart of operation when an anomaly is registered in an operational condition of a vehicle.

FIG. 4 shows a flow chart 400 of operation when an anomaly is registered in an operational condition of a vehicle. The flow chart includes the following steps:
- 401: Registering an anomaly in an operational condition of a vehicle.
- 402: Labelling the vehicle as a malfunctioning vehicle 240,340.
- 403: Requesting the malfunctioning vehicle 240,340 to stop or remain still.
- 404: Registering the stop position $X_S,Y_S$ of the malfunctioning vehicle 240,340.
- 405: Setting up an exclusion zone 225,325 on the rail system 108,308 using the main control system 109' from the stop position of the malfunctioning vehicle 240,340 and to the position of a service vehicle 20.
- 406: Are there operative vehicles within the shutdown zone 225,325?

If "YES" in step 406, a step of:
- 407: Rerouting all of the operating vehicles 250,350 out of the shutdown zone 225,325.

If "NO" in step 406, a step of:
- 408: Routing a service vehicle 20 using a secondary control system 109" from an initial position along the exclusion zone 225,325 for handling of the malfunctioning vehicle 240,340.
- 409: Bringing the malfunctioning vehicle 240,340 using the service vehicle 20 to a service area 160.
- 410: Utilizing the main control system 109' to re-open the exclusion zone 225 allowing the operative vehicles 250 to enter the exclusion zone 225.

FIGS. 5A-5F show an example of operational sequence when it is registered that a vehicle is malfunctioning, i.e. an anomaly in the operational condition of a vehicle, and how an exclusion zone on a rail system may be set up, and further the relationship between a first communication system operating the vehicles and a second communication system operating the service vehicle in order for the service vehicle to move from a service area along the exclusion zone to pick up and transport the malfunction vehicle back to the service area.

Figure 5A:
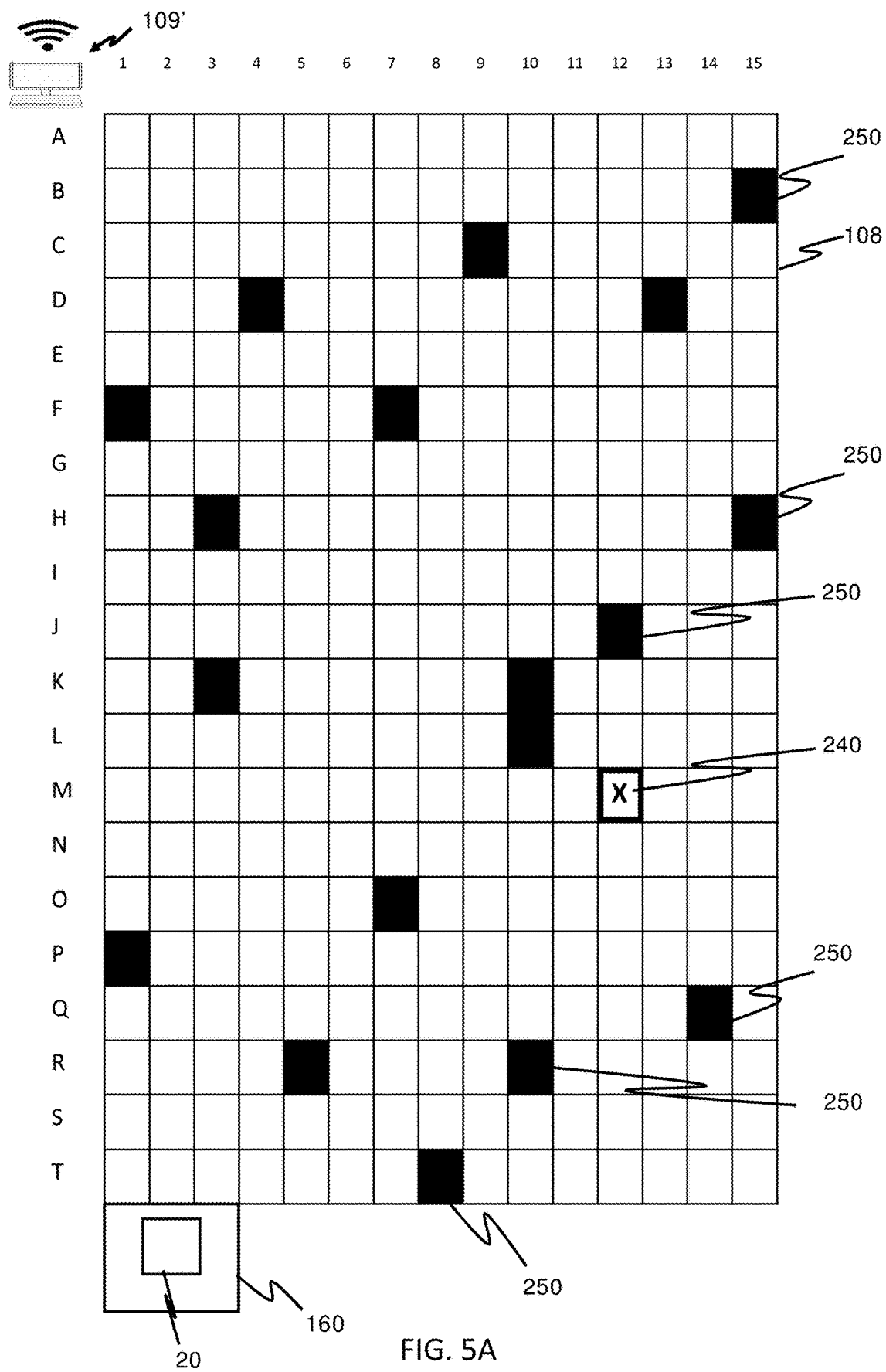
FIGS. 5A-5F show an example of operational sequence when it is registered that a vehicle is malfunctioning, i.e. an anomaly in the operational condition of a vehicle, and how an exclusion zone on a rail system may be set up, and further the relationship between a first communication system operating the vehicles and a second communication system operating the service vehicle in order for the service vehicle to move from a service area along the exclusion zone to pick up and transport the malfunction vehicle back to the service area.

In FIG. 5A the main control system 109' registers that the container handling vehicle 240 (denoted X) in cell M12 is malfunctioning.

Figure 5B:
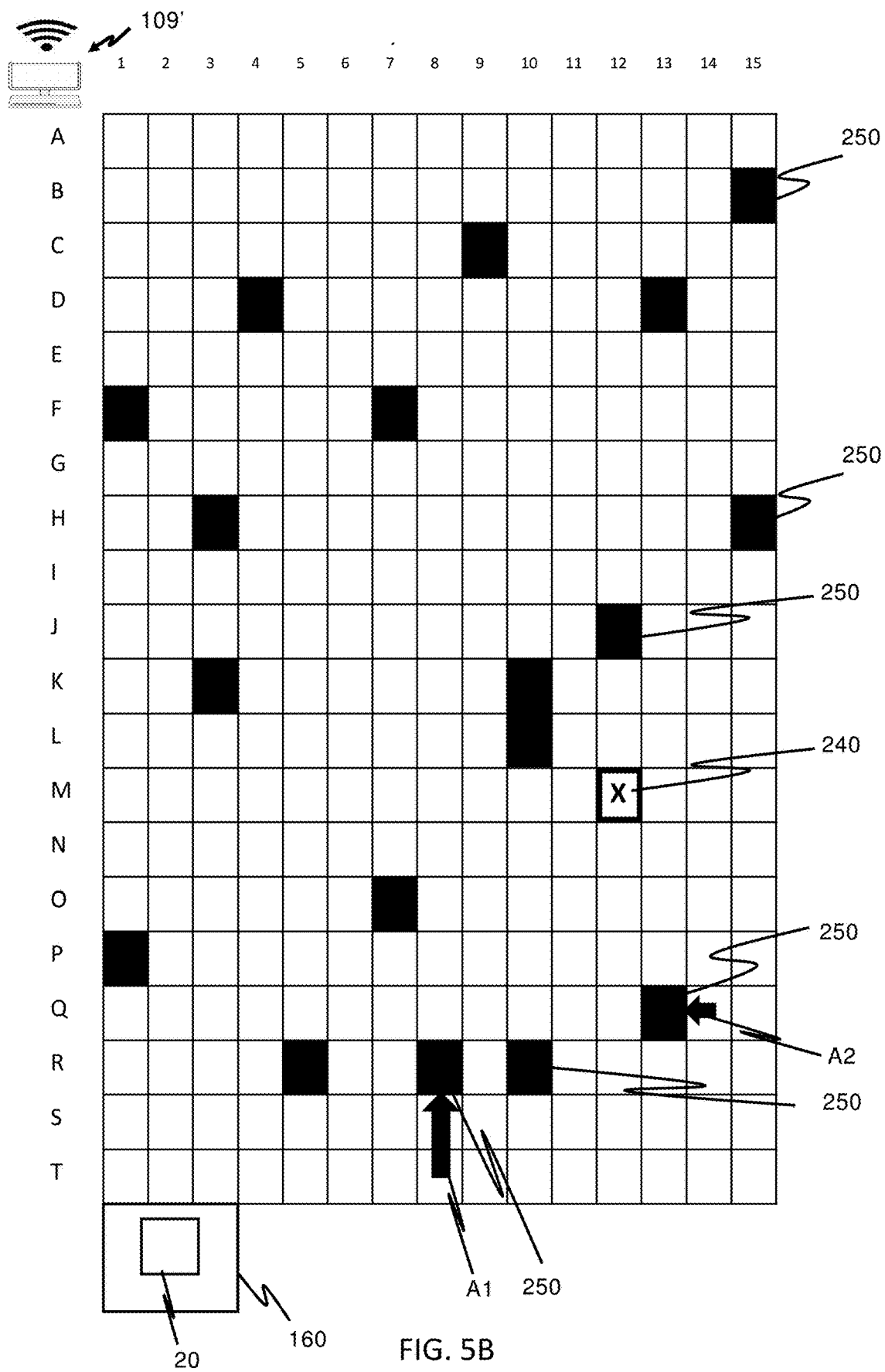

In FIG. 5B the container handling vehicle 250 in cell T8 has moved to cell R8 under instructions from the main control system 109', as indicated by the back end point and front end point of arrow A1. In addition, the container handling vehicle 250 in cell Q14 has moved to cell Q13 under instructions from the main control system 109', as indicated by the back end point and front end point of arrow A2.

Figure 5C:
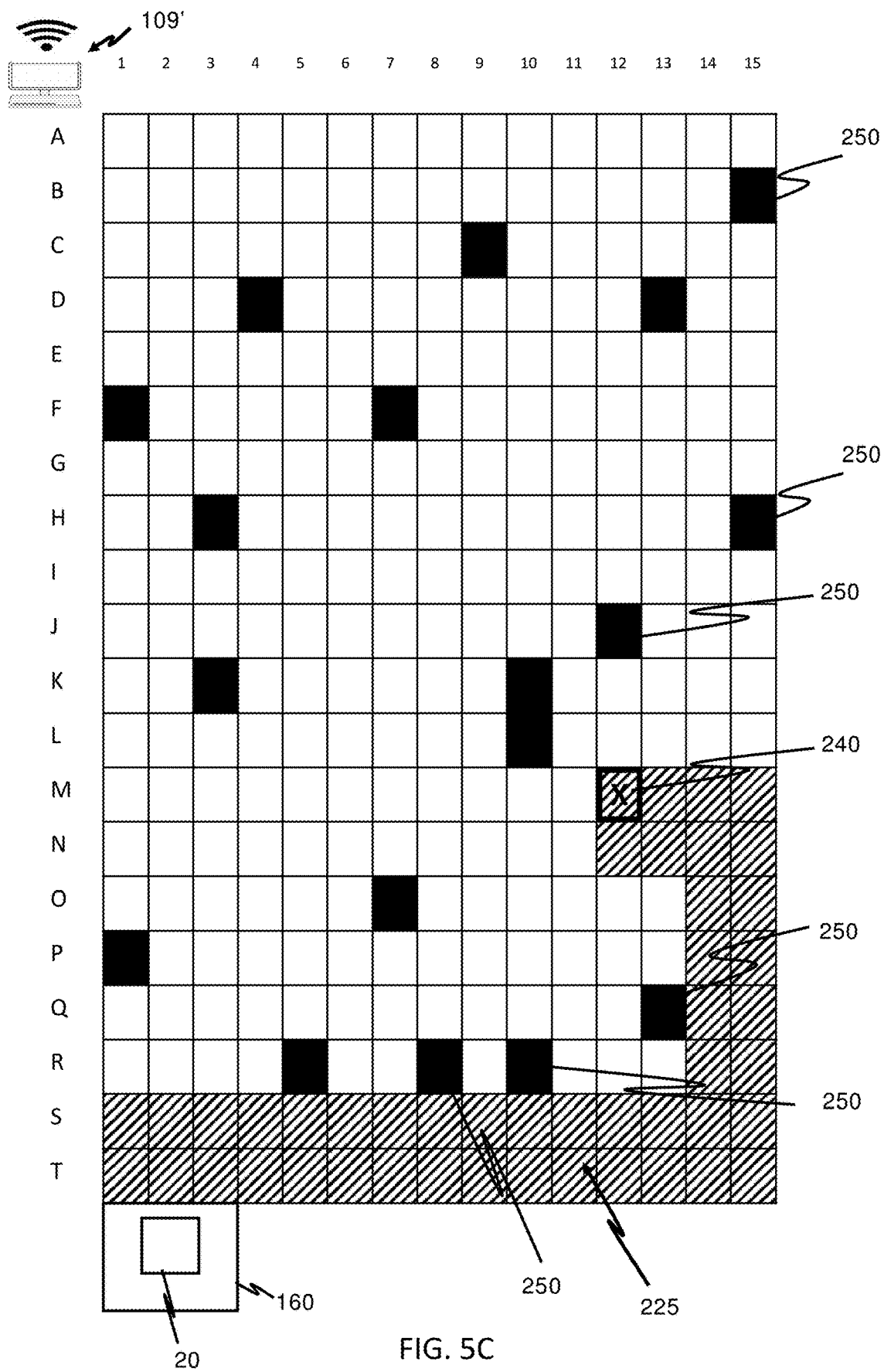

In FIG. 5C, an exclusion zone 225 (indicated by dashed area) has been created by the main control system 109' from the service area 160 to the malfunctioning container handling vehicle (X,240). The disclosed exclusion zone 225 has two cells width and extends all the way through the S and T rows, further to M14 and M15 and to M12 and N12 creating a continuous path for the service vehicle 20.

The exclusion zone 225 has been created at the boundary of the rail system 108 in order to minimize the impact on the remaining container handling vehicles 250 operating on the rail system 108. However, it will be understood that the exclusion zone 225 can be created anywhere on the rail system 108, whatever is most expedient in the specific situation and preferably along a path which minimizes the interruption of the other container handling jobs.

Figure 5D:
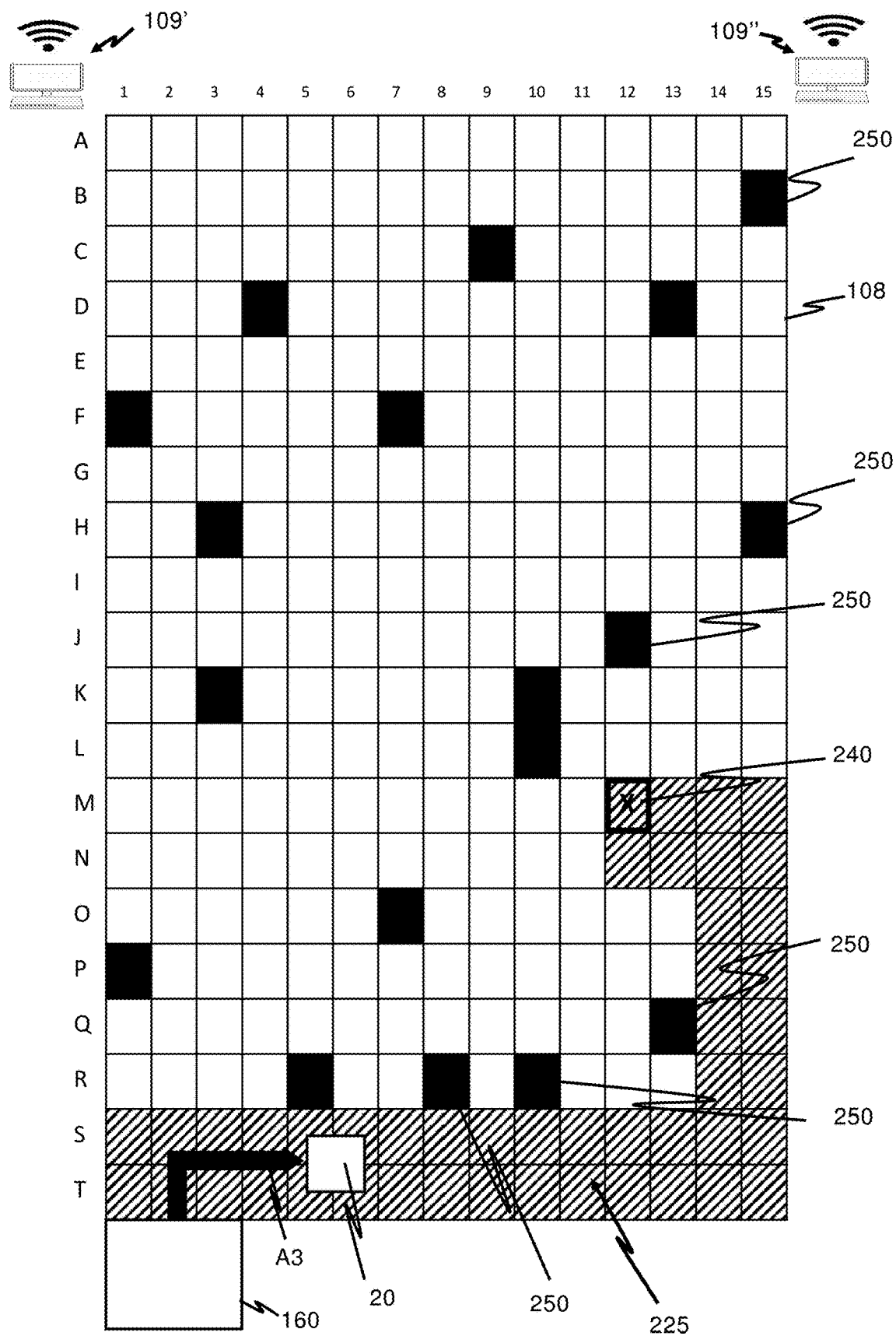

In FIG. 5D a service vehicle 20 has left its initial position in the service area 160 under control of the secondary control system 109" and occupies cells S5-S6-T5-T6, as indicated by arrow A3.

Figure 5E:
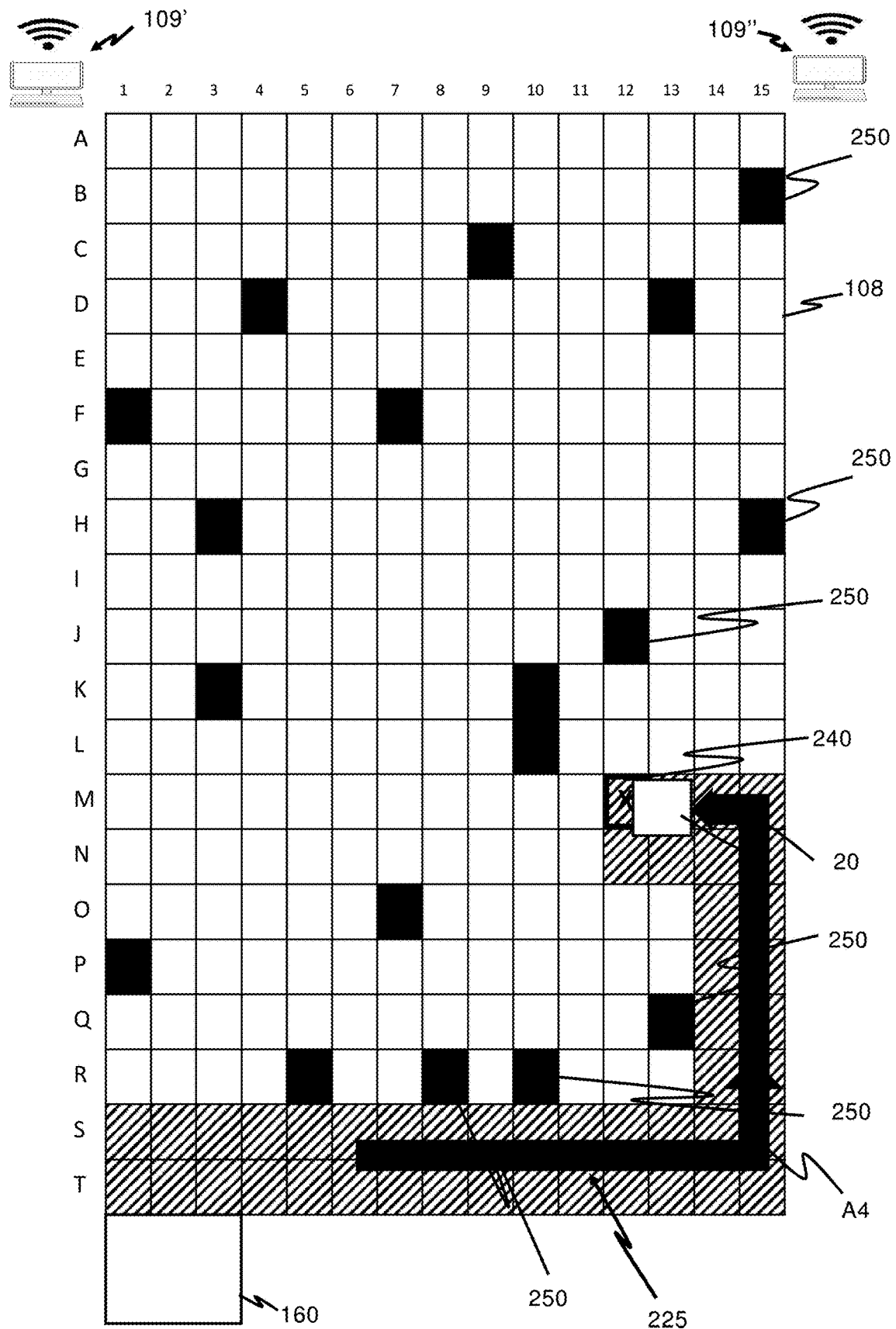

In FIG. 5E the service vehicle 20 has moved to the position of the malfunctioning container handling vehicle X,240 (next to cell M12) as indicated by arrow A4, and under control of the second communication system 109".

Figure 5F:
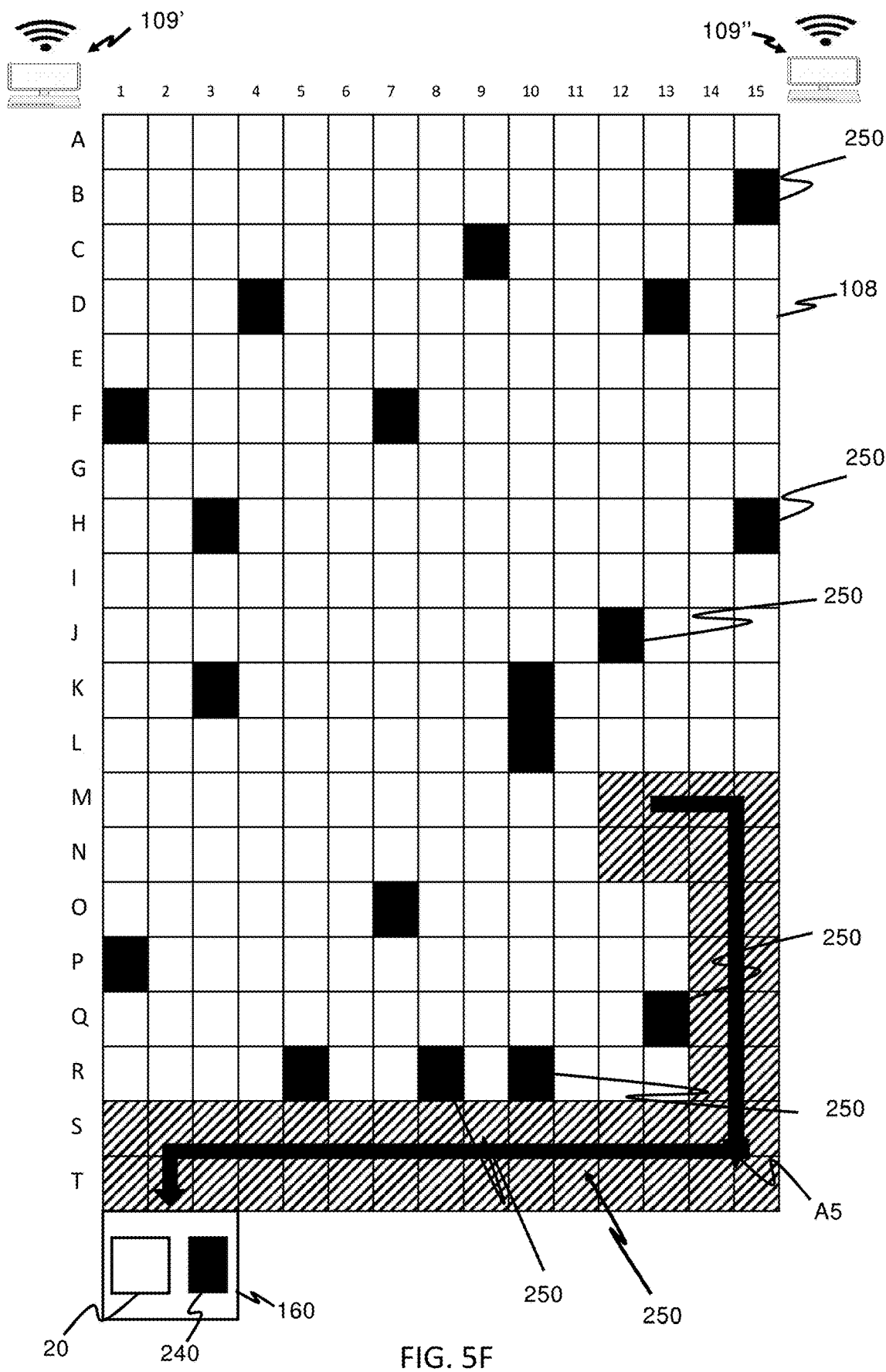

In FIG. 5F the service vehicle 20 has brought the malfunctioning container handling vehicle 240,X to the service area 160 along the exclusion zone 225 under control of the secondary control system 109", as indicated by arrow A5.

Once the malfunctioning container handling vehicle 240,X is within the service area 160, the main control system 109' may be used to re-classify the exclusion zone 225 allowing the operative vehicles 250 to enter the previously existed exclusion zone 225.

It shall be noted that in the example of FIGS. 5A-5F it is shown a container handling vehicle 250 operating on an upper rail system 108, i.e. the transport rail system 108, however the operation will be identical for a delivery vehicle 330,340,350 operating on a lower rail system 308, i.e. a delivery rail system 308 (as illustrated in FIGS. 3A and 3B).

Figure 6A:
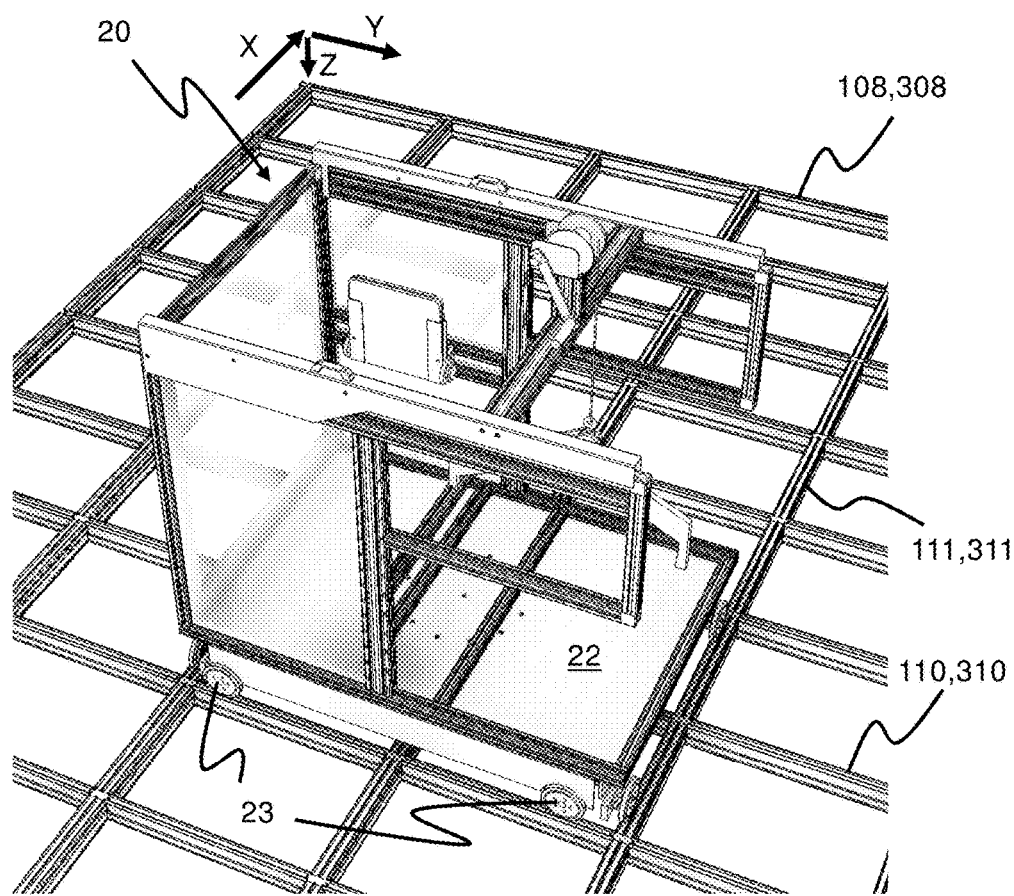
FIGS. 6A and 6B are perspective views of ride-on service vehicles suitable for operating on a rail system of an automated storage and retrieval system, where
Figure 6B:
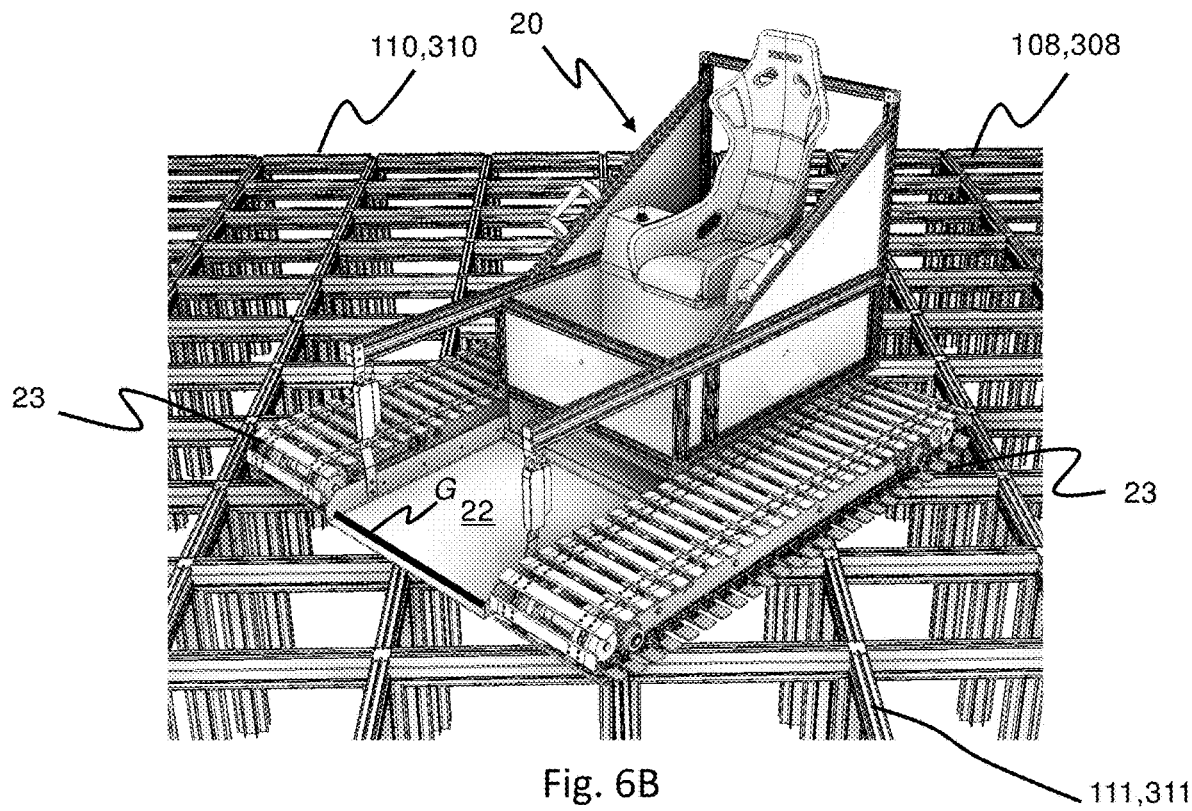

FIGS. 6A and 6B are perspective views of service vehicles suitable for operating on a rail system of an automated storage and retrieval system, where FIG. 6A shows a service vehicle having two set of wheels configured to follow the rails in X and Y directions and FIG. 6B shows a service vehicle having caterpillar tracks configured to drive on top of the rail system. Another service vehicle 20 suitable for the operations described above is shown in FIG. 7A, FIG. 7B and FIG. 7C.

In FIG. 6A the service vehicle 20 comprises a lifting mechanism. In both examples of FIGS. 6A and 6B the service vehicles 20 comprises a seat 25 for the operator and a support base 22 for support of malfunctioning vehicles 240,340 and driving means 23 to enable movement of the service vehicle 20. The service vehicle 20 could of course comprise other configurations and the present invention is not limited to these two examples.

In FIG. 6A the driving means 23 comprises two set of four wheels, where at least one of the sets may be raised and lowered. Hence, the driving means are similar to the driving means of the above described container handling vehicles 250 and container delivery vehicles 350. The wheels follow the rails 110,310,111,311 of the transport and/or delivery rail system(s) 108,308.

In FIG. 6B the driving means 23 of the service vehicle 20 comprises caterpillar tracks configured to drive on top of the rails 110,310,111,311, thereby allowing movement in any direction in the horizontal planes P,$P_L$ of either the transport rail system 108 or the delivery rail system 308.

Figures 8A, 8B, 8C:
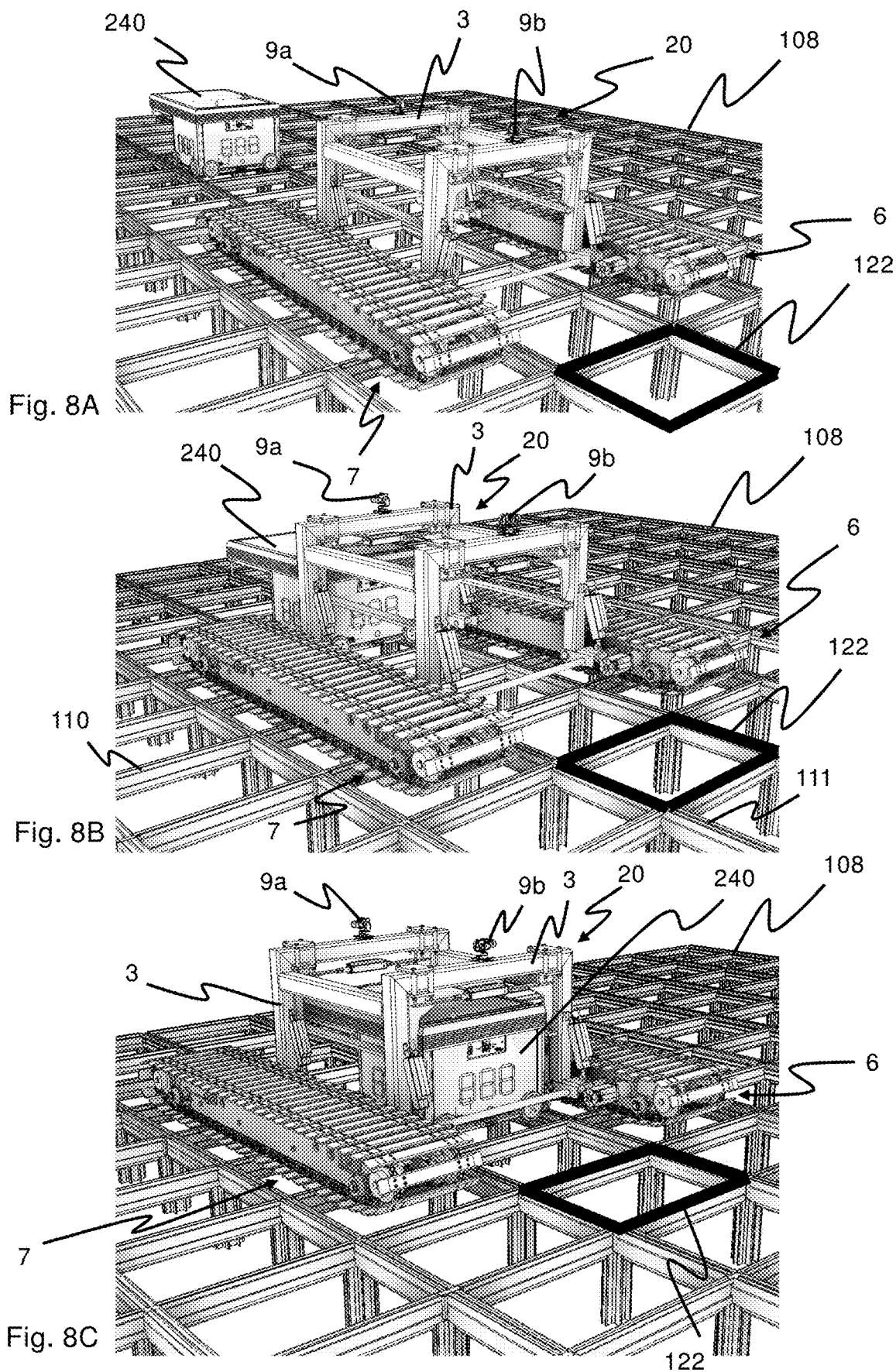
FIGS. 8A-C are perspective side views of the service vehicle of FIG. 7, where
Figure 9A:
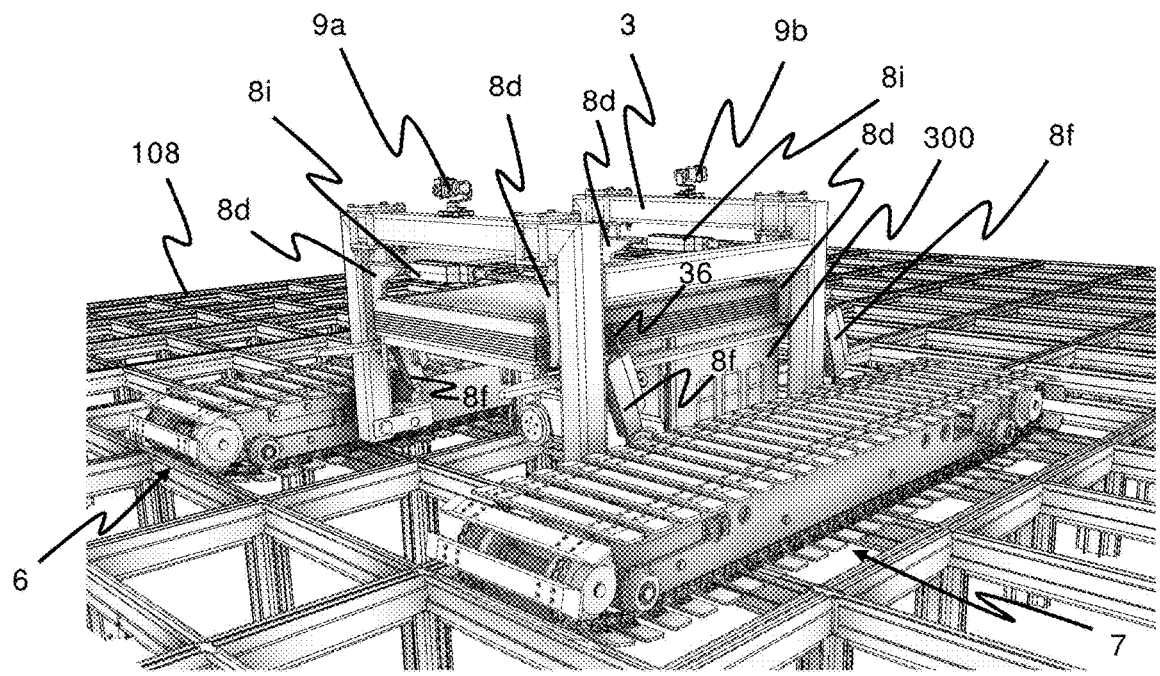
FIGS. 9A and B are perspective side views of the service vehicle of FIGS. 7 and 8, where FIG. 9A and FIG. 9 B show the service vehicle in an operating position where the container handling vehicle is contacting the rail system and a transport position where the container handling vehicle is raised above the rail system, respectively.
Figure 9B:
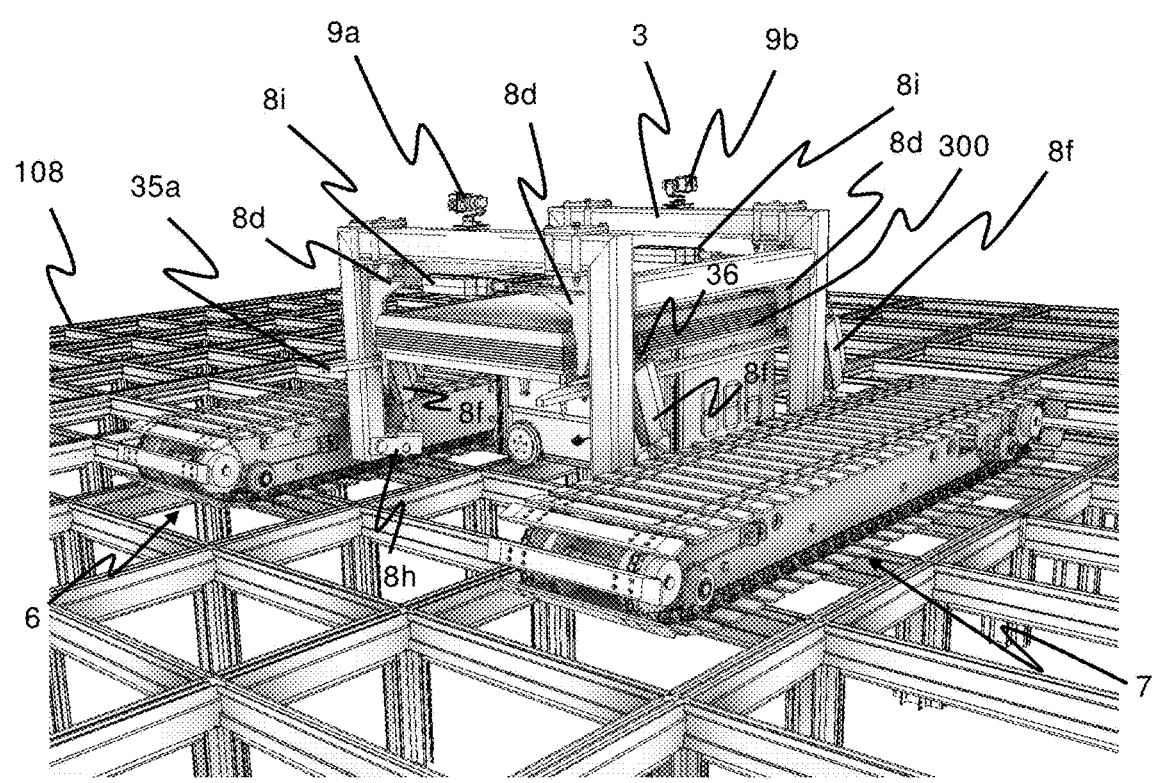

FIGS. 7-9 show a service vehicle 20, in which all operations of the vehicle 20 are performed fully remotely, that is, without any need for a human operator to directly interact with a control system onboard the vehicle 20 during the service procedure.

The service vehicle 20 of FIGS. 7-9 comprises two caterpillar tracks/rollers 6,7 coupled to two opposite vertical sides of a vehicle body 3. At least one of the two other vertical sides of the vertical body 3 is configured to receive at least one malfunctioning vehicle 240,340 to be serviced.

FIGS. 7-9 shows a particular configuration where the service vehicle 20 comprises two guiding pins 35 attached to each of the opposite vertical sides of the vehicle body 3 onto which the caterpillar tracks 6,7 are connected. The ends of each guiding pins 35 nearest the container handling vehicle receiving side of the vehicle body 3 displays a tapered end allowing the malfunctioning vehicle 240,340 to be guided correctly into the vehicle body 3. A remotely operated registration unit 9 in form of a forward camera 9a and a rearward camera 9b is mounted on the top horizontal side of the vehicle body 3.

The transfer device 8 comprises a lifting mechanism 8c which includes one or more vertical linear actuators 8f. Each of the actuators 8f has one end connected to a pivot support 8h that pivotally couples to the vehicle body 3 with a rotational axis parallel to the underlying rail system 108 and the other end to a lifting claw 8d. The lifting claws 8d may be displaceable in a horizontal direction relative to the vehicle body 3 by use of horizontal linear actuators 8i, i.e. with a horizontal non-zero component.

The service vehicle 20 is remotely operated by a remote control system via one or more onboard transmitters 36. Alternatively, or in addition, similar transmitters 36 may be arranged on the vehicle body 3, within the registration unit 9, on one or both of the rollers 6,7, etc.

As for the above disclosed embodiments the caterpillar tracks/rollers 6,7 have a length L extending across a plurality of grid cells 122, preferably four or more.

The opening of the vertical containing handling vehicle receiving side of the vehicle body 3, including any guiding pins 35, has a minimum width G being equal to, or larger than, the overall width of the malfunctioning vehicle(s) 240,340 to be serviced.

The procedure for picking up a malfunctioning vehicle 240,340 by the service vehicle 20 may proceed in the following way:

(FIG. 8A) The service vehicle 20 approaches, along an exclusion zone, a position adjacent to the one or more malfunctioning vehicles 240,340 to be transported using signal communication between the main control system 109' and the one or more of the onboard transmitters/receivers. If needed, the orientation of the service vehicle 20 is changed so that the vehicle receiving opening of the service vehicle 20 is facing towards the malfunctioning vehicle(s) 240,340.

(FIGS. 8B and C) The service vehicle 20 is remotely guided so that the malfunctioning vehicle(s) 240,340 enters through the receiving opening of the vehicle body 3, between the two caterpillar tracks/rollers 6 so that the transfer device 8 is in an interacting position, i.e. with the plurality of lifting claws 8d arranged on two opposite vertical sides of the or each malfunctioning vehicle 240,340. Alternatively, the service vehicle 20 may be kept still, and the malfunctioning vehicle(s) 240,340 may be remotely guided into the vehicle receiving opening. The correct horizontal position of the malfunctioning vehicle 240,340 inside the vehicle body 3 can be further controlled by a stopper 37 arranged on the vertical side opposite of the receiving opening. Such a stopper 37 will also contribute to increase the structural stability of the malfunctioning vehicle 240,340 within the vehicle body 3. In the example shown in FIGS. 7-9 this stopper is illustrated as a horizontal extending bar arranged to abut the malfunctioning vehicle 240,340 when the latter is fully inside the vehicle body 3 of the service vehicle 20.

(FIG. 9A) When the transfer device 8 is in the interacting position relative to the malfunctioning vehicle(s) 240, 240, the lifting claws 8d are displaced horizontally using the horizontal linear actuators 8i until the lifting claws 8d make physical contact with the malfunctioning vehicle(s) 240,340.

(FIG. 9B) The vertical linear actuator(s) 8f is/are remotely operated, causing the vehicle body 3 to be lifted from the rail system 108 due to the pivoting movement of the pivot support(s) 8h. As a result of the established physical contact between the lifting claws 8d and the malfunctioning vehicle(s) 240,340, the latter is lifted from the rail system 108, thereby setting the service vehicle 20 in a transport position.

The service vehicle 20 is moved to its predetermined position on the rail system 108, or out of the rail system 108, with the one or more malfunctioning vehicles 240,340.

In all embodiments, the rollers 6,7 comprise endless tracks (i.e. looped chains) 6d driven by toothed belt wheels 6a,6b arranged within the chains 6d. However, it may be envisaged configuration where one or more of the toothed wheels 6a,6b are arranged outside the looped chain 6d. Instead of toothed wheels 6,7, the rollers 6,7 may comprise alternative drive mechanism such as wheels having other types of means for meshing or coupling to their respective chains 6d. Further, the rollers 6,7 may be composed of components other than endless belts, for example a set of wheels wide enough to cover at least one grid cell 122.

All the embodiments of the service vehicle 20 in FIGS. 7-9 may be easily configured to be maneuvered on the rail system without the need for an onboard operator 50, for example by operations performed entirely by a remotely located human operator 50 or by a fully or partly automated control system or a combination thereof.

Embodiments may also be envisaged where the full operation of the service vehicle 20 is partly due to the operation of an onboard operator and partly due to a remotely located human operator or alternatively a combination between the operation of an onboard operator and a fully or partly automated control system.

It is now referred to FIGS. 10-14. Here, it is shown a service vehicle 20 for performing support operations in the automated storage and retrieval system 1.

Figure 10:
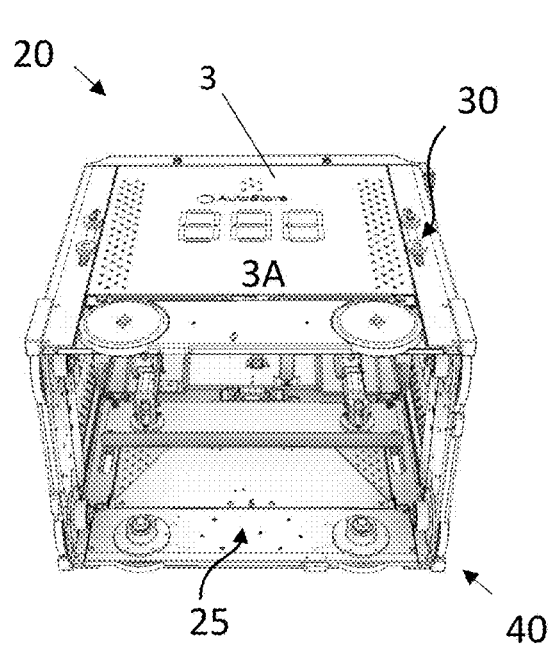
FIG. 10 illustrates a perspective view from below of an exemplary service vehicle.
Figure 11:
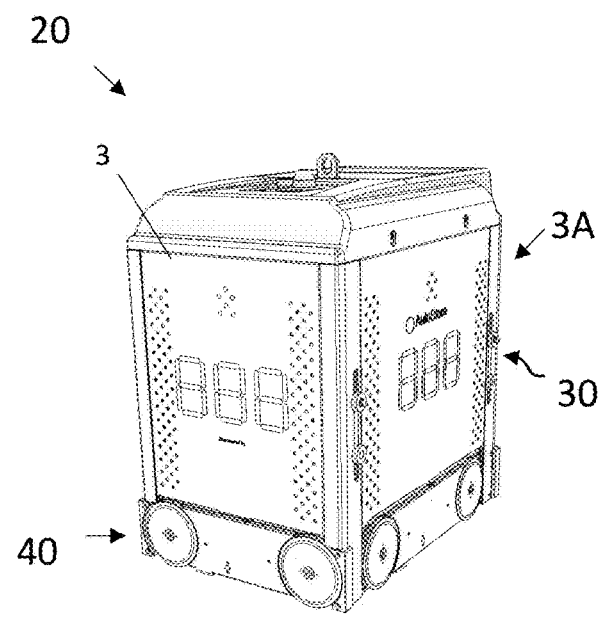
FIG. 11 illustrates a perspective side view of the service vehicle in FIG. 10.
Figure 12:
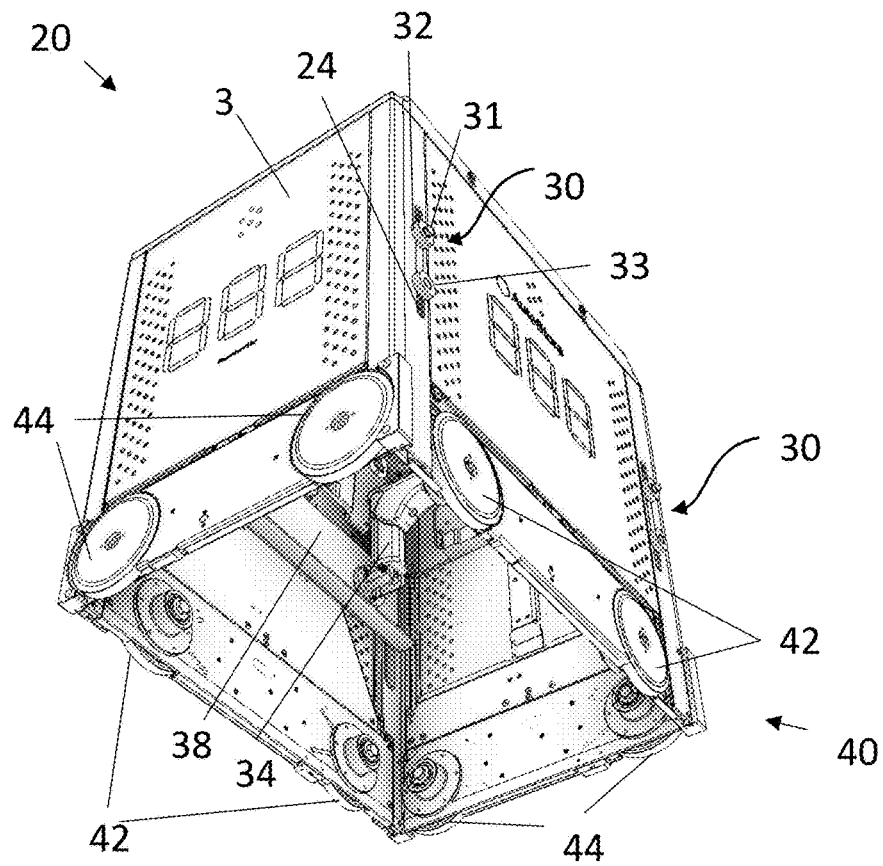
FIG. 12 illustrates another perspective view from below of the service vehicle shown in FIG. 10.

The service vehicle 20 comprises a vehicle body 3 with a central cavity 25 (FIG. 10). A drive system 40 is provided in the lower part of the service vehicle 20. The drive system 40 is configured to drive the service vehicle 20 along the track system 108 of the automated storage and retrieval system 1. The drive system 40 comprises a motor, typically an electric motor, and a power source, typically a rechargeable battery. The drive system 40 further comprises a first set of wheels 42 and a second set of wheels 44, where the service vehicle 20 is moving in a first direction (for example X-direction) when the first set of wheels 42 are in contact with the track system 108, 308 and where the service vehicle 20 is moving in a second direction (for example the Y-direction) when the second set of wheels 44 are in contact with the track system 108. The drive system 40 also comprises an actuator for bringing the desired set of wheels in contact with the track system. The drive system 40 further comprises a control system for controlling the movement of the service vehicle 20 within the system 1. It should be noted that the drive system 40 of the service vehicle 20 is considered to be known for a person skilled in the art.

The service vehicle 20 further comprises a connection system 30 provided on a first side 3A of the vehicle body 3. The connection system 30 is connectable to, and disconnectable from, a connection interface CI, for example a connection interface CI of an additional support unit (see FIG. 15). The connection system 30 will be described in further in detail below.

Figure 13:
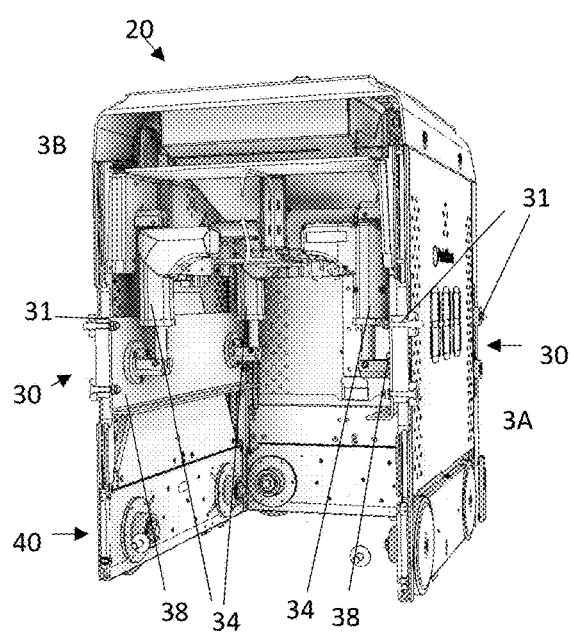
FIG. 13. illustrates the inside of the service vehicle of FIG. 10 with the actuators in the lower position.

First, it should be noted that the embodiment of the service vehicle 20 shown in the drawings comprises one connection system 30 provided on a first side 3A of the vehicle body 3 and an additional connection system 30 provided on a second side 3B, opposite of the first side 3A (se FIG. 13). For many of the applications described herein, one such connection system 30 may be sufficient. It is also possible to provide the service vehicle 20 with a corresponding connection system 30 on a third side and/or fourth side.

Now, the connection system 30 will be described in detail with reference to FIG. 13, 14 and FIGS. 19A-19D.

In FIG. 19A, it is shown that the exemplary connection system 30 comprises a connector member or pin 31 protruding through an aperture or slot 24 of the vehicle body 3. In the present embodiment, the connector pin 31 has two sections, a first section having a head or pin head 31a and a second elongated section or shank 31b defined with a longitudinal axis X31. The shank 31b is cylindrical in the present embodiment.

In the present embodiment, the slot 24 is a vertical slot 24, in which the connector pin 31 can be moved vertically by means of an actuator 34. The actuator 34 is an electric linear actuator 34.

On the outside of the vehicle body 3, a first contact body 32 is provided. The first contact body 32 can be connected to the connector pin 31 or to the vehicle body 3 at a horizontal distance from the pin head 31a. In the present embodiment, the first contact body 32 is connected to and around the connector pin 31.

In addition to the first contact body 32, the connection system 30 comprises a second contact body 33 provided at a vertical distance from the first contact body 32.

A rigid member 38 is provided on the inside of the vehicle body 21. The rigid member 38 is used to connect the actuator 34 to the connector pin 31 and also to the first contact body 32. Moreover, the second contact body 33 is connected to the rigid member 38 by means of a connector 39. Hence, when the actuator 34 is moving vertically, also the rigid member 38, the connector pin 31 and the first and second contact bodies 32, 33 are moving vertically.

In FIG. 19A, the connection system 30 is in its lower or unlocked position.

It is now referred to FIGS. 19B and 19C, in which the connection interface CI is shown to comprise a plate-shaped connection structure CS with a keyhole KH. In the present embodiment, the keyhole KH comprises a circular opening Kha into which the pin head 31a can be easily inserted and a narrower slot KHb above the circular opening Kha into which the shank 31b can be moved, but from which the pin head 31a cannot easily be retrieved. Hence, when the connection system 30 is in the lower or unlocked position (and the connection interface CI is stationary), the connector pin 31 may be moved into and out from the keyhole KH.

It is now referred to FIG. 19D. Here it is shown that the connector pin 31 has been moved into the keyhole KH and then moved upwardly by means of the actuator 34. This position is referred to as an upper or locked position. In this locked position, if the service vehicle is moved to the left in FIG. 19D, the connection structure CS will be pulled together with the service vehicle 20 as the pin head 31 is engaged with the rear side RS of the connection structure CS. By moving the connector pin downwardly to the unlocked position by means of the actuator, the connection system 30 will be free to move out of engagement with the connection interface CI.

It should be noted that in FIG. 19D, contact surfaces 32a, 33a of the first and second contact bodies 32, 33 are in contact with a front side FS of the connection structure CS. Hence, the first and second contact bodies 32, 33 provide that the connection interface CI is oriented as desired with respect to the vehicle body 3. Preferably, the connection interface CI is oriented parallel with the side 3A of the vehicle body 3. Preferably, both the first side 3A of the vehicle body 21 and the connection interface CI are oriented vertically as shown in FIGS. 19A-D.

In FIG. 19D it is also shown that the longitudinal distance Lcs between the contact surface 32a of the contact body 32 and the pin head 31a is equal to or a little longer than the thickness Tcs of the connection structure CS.

Figure 14:
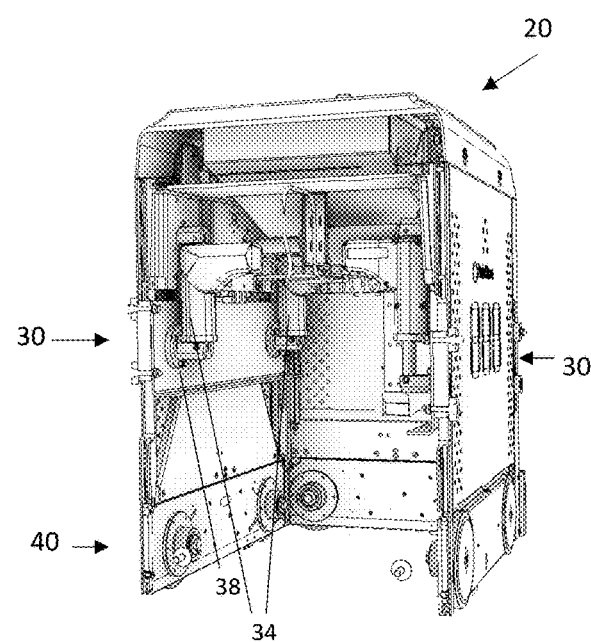
FIG. 14 illustrates the inside of the service vehicle of FIG. 10 with the actuators on one side in the upper position.

It is now referred to FIGS. 13 and 14. Here it is shown that the connection system 30 comprises two connector pins 31 on the first side 3a of the vehicle body 3. The two connector pins 31 are provided in two slots 24 in the vehicle body 3, where the two slots 24 are spaced apart from each other.

The further connection system 30 on the second side 3b of the vehicle body 21 also comprises two such connector pins 31 provided in two spaced apart slots 24.

The rigid member 38 described above with reference to FIGS. 12-14 is here used as a rigid cross member 38 which is connecting the connector pins 31 to each other. In this way, the two connector pins 31 are moved vertically in parallel. It should be noted that two actuators 34 are connected between the inside of the vehicle body 3 and each cross member 38.

The service vehicle 20 is based on the type of prior art container handling vehicle 250 shown in FIG. 1C, i.e. a container handling vehicle 250 with a cavity arranged centrally within the vehicle body 252. In FIG. 14, another example of such a container handling vehicle 250 is shown.

Only minor modifications are needed to manufacture a service vehicle 20 from such a container handling vehicle 250. One modification is that slots must be provided in the vehicle body 3 and that the different parts of the connection system 30 must be mounted to the vehicle. Preferably, the container lifting device of the prior art container handling vehicle 250 is removed to save costs and also to provide sufficient space for the actuators 34. In some applications, it may be required to modify the drive system, as the service vehicle 20 may be designed to handle a larger total weight than a typical container handling vehicle. Hence, a more powerful motor of the drive system 40 may be needed, possibly also more robust bearings for the wheels may be used etc. All in all, the number of modifications are still relatively low. In addition, relatively small modifications in the control system are needed, for controlling the actuators 34.

The automated storage and retrieval system 1 may comprise one or more service vehicles 20 and at least one additional support unit. The additional supporting unit comprises a connection interface CI to which the service vehicle 20 can connect to and disconnect from. Together, the service vehicle 20 and the additional supporting units form a support system for an automated storage and retrieval system 1.

In general, the connection system 30 may be configured to be connected to the connection interface CI of the additional support unit by the following operation:
 moving the connector pin 31 to a first (here: lower) position aligned with the keyhole KH of the connection interface CI of the unit;
 moving the connector pin 31 horizontally into the keyhole KH by moving the service vehicle 20 along the track system towards the unit;
 moving the connector pin 31 to a second (here: upper) position different from the first position.

In this second position, movement of the service vehicle 20 away from the unit will cause the unit to be pulled by the service vehicle. Movement of the service vehicle 20 towards the unit will cause the unit to be pushed by the service vehicle. In the two directions mentioned here, the service vehicle 20 and the unit will move along tracks 110 of FIG. 15.

Movement of the service vehicle in a direction perpendicular to the push/pull direction will cause the unit to be dragged or pushed in parallel with the service vehicle 20. This last movement will, as described in the introduction above, require that the correct set of wheels become in contact with tracks 111, or tracks parallel with tracks 111, in FIG. 15.

In general, the connection system 30 is configured to be connected from the connection interface CI by the following operation:
 lowering the connector pin 31 to its first (here: lower) position again;
 moving the connector pin 31 horizontally out of the keyhole KH by moving the service vehicle 20 along the rails track system 108 away from the unit.

Examples of different support units will be described through the following examples:

Example 1

Figure 15:
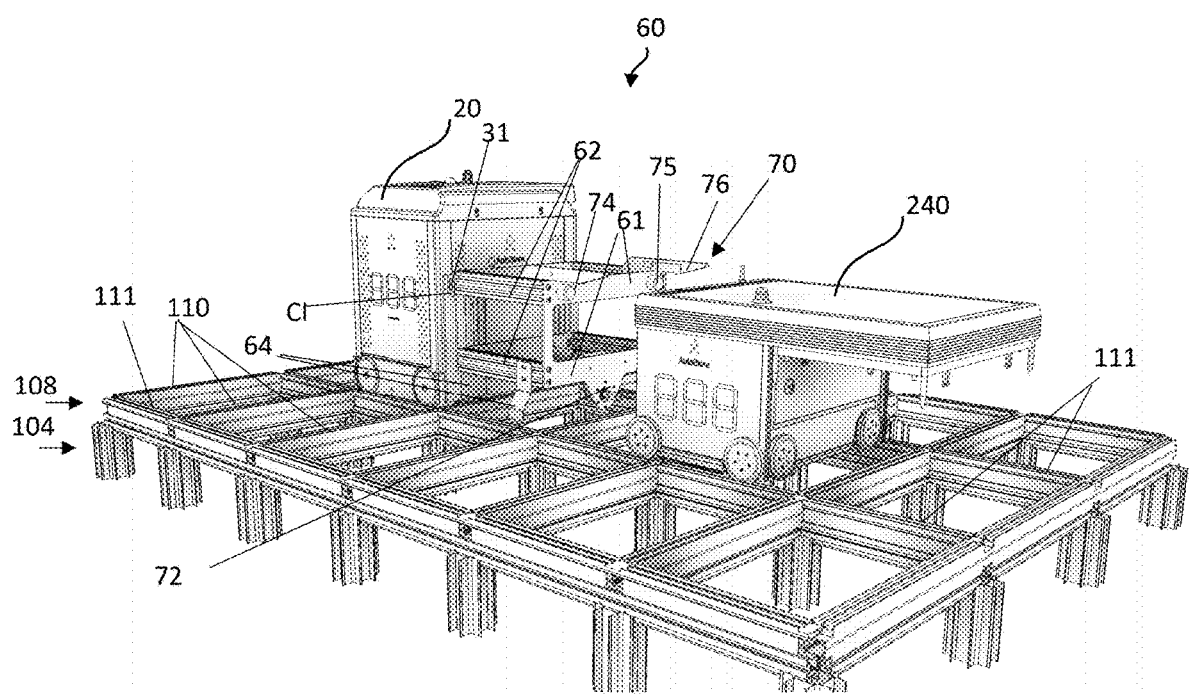
FIG. 15 illustrates a perspective view of an exemplary service vehicle using an adaptor to connect to a first type of container handling vehicle.
Figure 16:
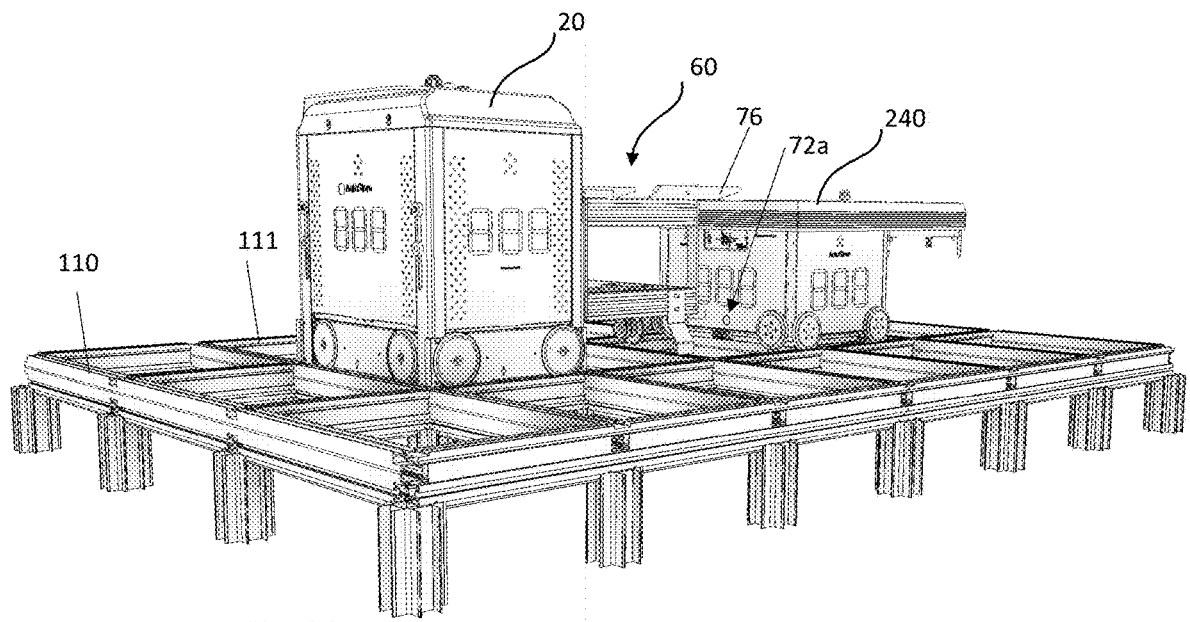
FIG. 16 illustrates a perspective view of the connection interface of the first type of container handling vehicle before being connected to the adapter.
Figure 17:
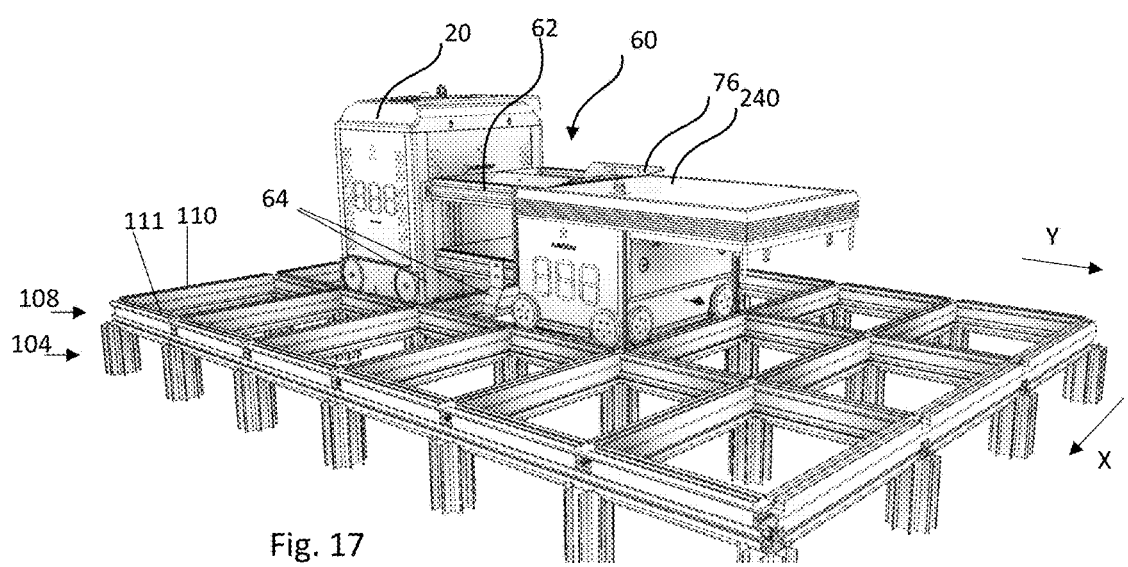
FIG. 17 illustrates the service vehicle and adapter of FIG. 16 being connected to the container handling vehicle.

It is here referred to FIGS. 15, 16 and 17. Here, the service vehicle 20 is connected to an intermediate supporting unit 60. The purpose of the intermediate supporting unit 60 is to transport a failed container handling vehicle 240 which is stuck in a position on the rail system 108 and is not itself capable to move to the service area due to a failure, such as an empty battery, an electrical or mechanical failure etc. To fix the vehicle 240, it must be moved to the service area.

As shown in FIG. 15, the intermediate supporting unit 60 comprises a connection interface CI fixed to a rigid framework formed by elongated bar elements 62 protruding away from the connection interface CI and cross bar elements 61 interconnecting the bar elements 62. In addition, the framework of the unit 60 comprises downwardly protruding supporting elements 64.

The connector pins 31 of the connection system 30 of the service vehicle 20 are connected to the connection interface CI and the connector pins 31 are in their upper and locked position. It can also be seen in FIG. 15 that the unit 60 is lifted by the service vehicle 20, i.e. the unit 60 is not in contact with the track system 108.

The distance between the respective downwardly protruding supporting elements 64 are adapted to the track system 108. Hence, by lowering the connector pins 31 of the service vehicle 20, the downwardly protruding supporting elements 64 will come into contact with the track system 108 and the service vehicle 20 can disconnect from the unit 60. The service vehicle 20 can re-connect to the unit 60 by moving towards the unit 60 with its connector pins 31 in their lower position and then elevate the connector pins 31 when they have been inserted into the keyhole of the connection interface again.

In FIG. 15, it is shown that the additional support unit 60 comprises a further connection system 70 for connection to a container handling vehicle 240,250. The connection system 70 comprises a wheel actuator 72 and a push body 74, 75 for contact with the container handling vehicle 240,250 when it is pushed by the service vehicle 20. In addition, the further connection system 70 comprises a pull body 76 for contact with the container handling vehicle 240,250 when pulled by the service vehicle 20. The pull body 76 may be hook or other type of connection interface for connection to an interface of the container handling vehicle 240,250.

It should be noted that the connection system 30 of the service vehicle 20 in this example may have a third position. In the first position, as described above, the connection system 30 has lowered the unit and the unit is in contact with the track system 108. Here, the service vehicle may move the connector pin 31 into or out from the keyhole KH of the connection interface CI. In the second position, the connection system 30 has lifted the unit and the unit is no longer in contact with the track system 108. However, the pull body 76 is not sufficiently elevated to be moved over the vehicle 240,250. Hence, to engage the additional connection system 70 with the vehicle 240,250, the connector pins 31 and hence the unit 60 is elevated to a third position above the second position. Now, the pull body 76 of the unit can be moved over the vehicle 240,250 and then the connection system 30 can be lowered to the second position again. Now, the pull body 76 is engaged with the vehicle 240,250. To disconnect from the vehicle 240,250, the unit 60 is elevated from the third position and moved away from the vehicle 240,250, as the pull body 76 is not engaged with the vehicle 240,250 in the third position.

The wheel actuator 72 is connected to a mechanical interface 72a of the container handling vehicle 240,250 for adjusting wheel elevation of the container handling vehicle 240,250, i.e. to mechanically control if the wheels should be in contact with tracks 110 or tracks 111 of the track system. The wheel actuator 72 is driven by an electric motor controlled by the control system of the service vehicle 20 or by a control system of the entire system 1.

It should be noted that the length of the elongated bar elements 62 is adapted to the length between the rails 111. Hence, when moving along tracks 111, four tracks 11 are in contact with the wheels of the service vehicle 20 and the wheels of the vehicle 301, while when moving along tracks 110, the same two tracks are used both by the service vehicle 20 and the vehicle 240,250.

It should be noted that in this example, no modification of the vehicle 340,350 is needed.

Example 2

Figure 18A:
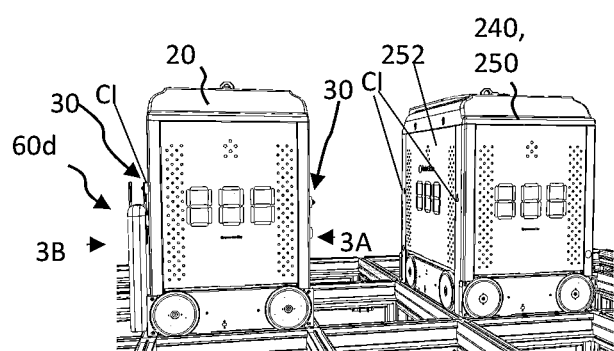
FIG. 18A illustrates a perspective side view of an exemplary service vehicle with to a counterbalance connected to it and adjacent to a second type of container handling vehicle.
Figure 18B:
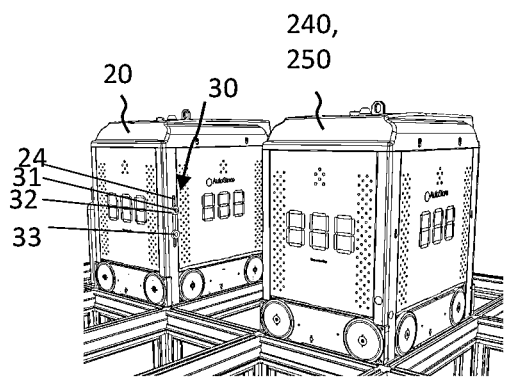
FIG. 18B illustrates another perspective view of the service vehicle of FIG. 18A and the second type of container handling vehicle.

It is now referred to FIGS. 18A-D. The additional support unit is here a counterweight unit 60d for balancing the service vehicle 20. The unit 60d has a connection interface CI (not shown) which in FIGS. 18A and 18B is connected to the connection system 30 provided on the second side 3B of the vehicle body 3. The counterweight unit 60d is lifted by the service vehicle 20.

The purpose of the counterweight unit 60d is to enable the service vehicle 20 to lift and transport a failed container handling vehicle 240,250 of the type shown in FIGS. 18A and 18B. The container handling vehicle 240,250 is similar to prior art vehicles, with one modification: The container handling vehicle 240,250 comprises a connection interface CI. In this example, the connection interface CI is provided as two openings in the vehicle body 252, one opening for each of the connector pins 31 of the connection system 30 on the second side 3B of the vehicle body 3 of the service vehicle 20.

Figure 18C:
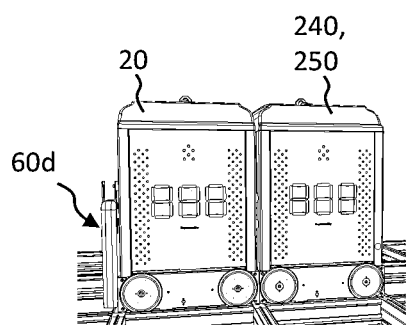
FIG. 18C illustrates the service vehicle of FIG. 18A being connected to both the weight unit and the second type of container handling vehicle.

In FIG. 18C, it is shown that the connector pins 31 of the connection system 30 moved into the openings of the connection interface CI of the vehicle 240,250.

Figure 18D:
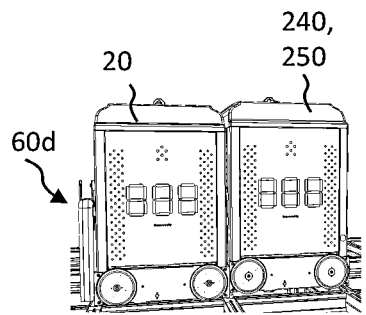
FIG. 18D illustrates how that the service vehicle of FIG. 18A is able to lift the second type of container handling vehicle up from the rails.

In FIG. 18D, it is shown that the connection system 30 is in the second (or third) position, lifting the vehicle 240,250 up from the grid. Due to the counterweight unit 60d, the service vehicle 20 will not tilt when lifting the vehicle 240,250.

Alternative Embodiments

In the above embodiments, the connector pin 31 including the pin head 31a was rotationally symmetrical around its longitudinal axis.

It is now referred to FIG. 20A-D, where some examples of alternative embodiments are shown.

Figure 20A:
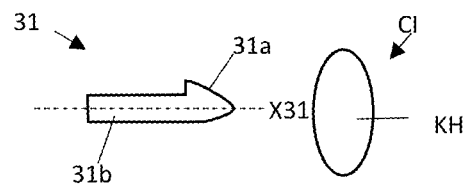
FIG. 20A-D illustrate alternative embodiments of the connection system.

In FIG. 20A, the connector pin 31 is not rotationally symmetrical, as only the upper part of the pin head 31a is protruding upwardly in a direction perpendicular to the longitudinal axis X31. Here, the keyhole KH of the connection interface is oval-shaped.

Figure 20B:
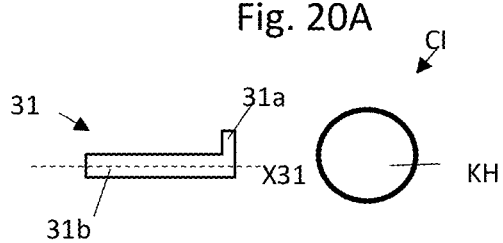

In FIG. 20B, the pin head 31a is a rectangle protruding up from the connector pin 31. Here, the keyhole KH of the connection interface is circular.

Figure 20C:
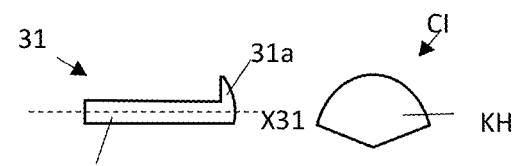

In FIG. 20C, the pin head 31a corresponds to the one shown in FIG. 20B. However, here the distal end of the head is rounded, to ease insertion into the keyhole KH. Here, the keyhole KH of the connection interface is semicircular.

Figure 20D:
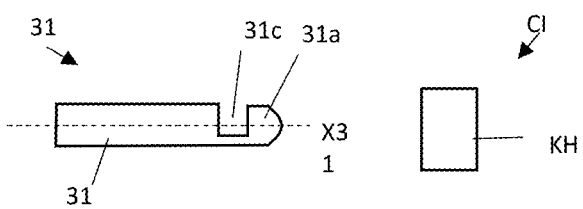

In FIG. 20D, the pin head 31a is formed by providing a notch in the connector pin 31 itself, thereby separating the connector pin 31 into two separate sections, a distal section forming the pin head 31a and a proximal section 31b. Here, the keyhole KH of the connection interface is rectangular.

It should be noted that all of the above connector pins 31 may be used in combination with all of the above keyholes KH. It should be noted that the present invention is not limited to the specific examples described and shown in the drawings, many other alternatives are considered to be within the scope of the invention as defined by the claims.

It should also be noted that the operation of the actuator 34 may be dependent on, or independent of, the operation of the drive system 40. In one embodiment, the vertical distance between the slot 24 and the track system will be the same when the service vehicle is moving along tracks 110 and when the service vehicle is moving along tracks 110. In such a case, the operation of the actuator 34 can be independent from the drive system 40. However, in case the vertical distance between the slot 24 and the track system is different when the service vehicle is moving along tracks 110 and when the service vehicle is moving along tracks 111 (due to different elevation of the vehicle body 3 and the different sets of wheels), then the actuator may be operated to change the height of the connector pins based on the travel direction.

In the preceding description, various aspects of the method and its related system according to the invention have been described with reference to the illustrative embodiment. For purposes of explanation, specific numbers, systems and configurations were set forth in order to provide a thorough understanding of the system and its workings. However, this description is not intended to be construed in a limiting sense. Various modifications and variations of the illustrative embodiment, as well as other embodiments of the method and the system, which are apparent to persons skilled in the art to which the disclosed subject matter pertains, are deemed to lie within the scope of the present invention.

| 1 | Automated storage and retrieval system |
|---|---|
| 3 | Service vehicle body |

-continued

| | |
|---|---|
| 3A | First side of service vehicle body |
| 3B | Second side of service vehicle body |
| 6 | First propulsion means/propulsion mechanism/rolling means/roller/caterpillar track |
| 6a | First toothed belt wheel for each endless belt 6, 7 |
| 6b | Second toothed belt wheel for each endless belt 6, 7 |
| 6d | Endless tracks/Looped chain/endless belt |
| 7 | Second propulsion means/propulsion mechanism/rolling means/roller/caterpillar track |
| 8 | Transfer device |
| 8c | Transfer motor/lifting mechanism |
| 8d | Attachment device/lifting hook/lifting claw |
| 8f | Vertical linear actuator |
| 8h | Pivot support for vertical linear actuator |
| 8i | Horizontal linear actuator |
| 9 | Registration unit/image capturing unit |
| 9a | Forward camera |
| 9b | Rearward camera |
| 20 | Service vehicle |
| 22 | A support base for malfunctioning vehicle |
| 23 | Driving means service vehicle |
| 24 | Aperture/slot |
| 25 | Central cavity |
| 30 | Connection system |
| 31 | Connector member/connector pin |
| 31a | First section/pin head |
| X31 | Longitudinal axis |
| 31b | Second elongated section or shank |
| 32 | First contact body |
| 33 | Second contact body |
| 34 | Actuator |
| 35 | Guiding pin |
| 36 | Transmitter |
| 37 | Stopper |
| 38 | Rigid member |
| 39 | connector |
| 40 | Drive system service vehicle/motor/power source |
| 42 | First set of wheels service vehicle |
| 44 | Second set of wheels service vehicle |
| 60 | Intermediate support unit/additional support unit |
| 60d | Counterweight unit |
| 61 | Elongated bar element |
| 62 | Cross bar element |
| 64 | supporting elements |
| 70 | connection system of additional support unit |
| 72 | Wheel actuator |
| 72a | Mechanical interface |
| 74, 75 | Push body |
| 76 | Pull body |
| 108 | Rail system |
| 108a | First transport rail system |
| 108b | Second transport rail system |
| 108c | Third transport rail system |
| 109' | Main Control system/first communication system |
| 109" | Secondary control system/second communication system |
| 110 | First set of parallel rails in first direction (X) |
| 111 | Second set of parallel rails in second direction (Y) |
| 115 | Grid opening in transport rail system |
| 119 | Delivery column/transfer column |
| 120 | Delivery column/transfer column |
| 122 | Grid cell of transport rail system |
| 125 | Vehicle blocking barrier |
| 130a | First vehicle passage between transport rail systems |
| 130b | Second vehicle passage between transport rail systems |
| 160 | Service area to transport rail system for service vehicle |
| 160a | First service area |
| 160b | Second service area |
| 160c | Third service area |
| 225 | Exclusion zone on transport rail system |
| 230 | Parked container handling vehicle |
| 230' | Boundary defining, parked vehicle |
| 230" | Non-boundary defining, parked vehicle |
| 240 | Malfunctioning container handling vehicle |
| 250 | Operative container handling vehicle |
| 251 | Wheel assembly for container handling vehicle |
| 252 | Vehicle body for container handling vehicle |
| 300 | Delivery framework structure |
| 308 | Delivery rail system |
| 310 | First set of parallel rails in first direction (X) on delivery rail system |
| 311 | Second set of parallel rails in second direction (Y) on delivery rail system |
| 315 | Grid opening in delivery rail system |
| 322 | Grid cell of delivery rail system |
| 330 | Parked container delivery vehicle |
| 330' | Boundary defining, parked vehicle |
| 330" | Non-boundary defining, parked vehicle |
| 340 | Malfunctioning container delivery vehicle |
| 350 | Operative container delivery vehicle |
| 351 | Wheel assembly for container delivery vehicle |
| 352 | Storage container support |
| X | First direction |
| Y | Second direction |
| Z | Third direction |
| P | Horizontal plane of rail system |
| A1, A2 | Arrow indicating movement of container handling vehicle |
| A3, A4 | Arrow indicating movement of service vehicle |
| A5 | Arrow indicating movement of service vehicle with malfunctioning container handling vehicle |
| CI | Connection interface |
| CS | Connection structure |
| G | Minimum width |
| KH | Keyhole |
| Kha | Circular opening |
| KHb | slot |
| RS | Rear side |
| FS | Front side |
| Lcs | Longitudinal distance |
| Tcs | Thickness connection structure |

The invention claimed is:

1. An automated storage and retrieval system comprising a rail system with perpendicular tracks in X and Y directions, wherein the automated storage and retrieval system comprises:
a plurality of remotely operated container handling vehicles configured to move laterally on the rail system;
a main control system using a first communication system for communicating with the plurality of remotely operated container handling vehicles, wherein the main control system monitors and controls movement of the plurality of remotely operated container handling vehicles via the first communication system;
at least one service vehicle movable on the rail system, wherein the at least one service vehicle is configured to bring a malfunctioning remotely operated container handling vehicle to a service area outside of the rail system where the plurality of remotely operated container handling vehicles operate; and
a secondary control system using a second communication system, wherein the second communication system is independent of the first communication system, and wherein the secondary control system is communicating with the at least one service vehicle on the rail system such as to monitor and control the movement of the at least one service vehicle;
wherein the main control system is configured to perform, by wireless data communication, at least:
determining an anomaly in an operational condition of a remotely operated container handling vehicle on the rail system,
registering the remotely operated container handling vehicle with the anomalous operational condition as a malfunctioning remotely operated container handling vehicle,
registering a position of the malfunctioning remotely operated container handling vehicle relative to the rail system, and setting up a two-dimensional exclusion zone extending from the malfunctioning remotely operated container handling vehicle to a position of the at least one service vehicle.

2. The automated storage and retrieval system according to claim 1, wherein the main control system is further configured to perform:
updating a movement pattern of the plurality of remotely operated container handling vehicles by instructing any remotely operated container handling vehicles positioned within the two-dimensional exclusion zone to move outside the two-dimensional exclusion zone and avoiding entry of any of remaining remotely operated container handling vehicles into the two-dimensional exclusion zone.

3. The automated storage and retrieval system according to claim 2, wherein, the secondary control system is configured to perform, by the wireless data communication:
operating the at least one service vehicle to move from an initial position to a position next to the malfunctioning remotely operated container handling vehicle along the two-dimensional exclusion zone.

4. The automated storage and retrieval system according to claim 1, wherein the first communication system and the second communication system are the same communication system or different communication systems.

5. The automated storage and retrieval system according to claim 4, wherein the first communication system and the second communication system operate with different frequencies.

6. The automated storage and retrieval system according to claim 4, wherein the first communication system and the second communication system have different coding and de-coding processes.

7. The automated storage and retrieval system according to claim 1, wherein the first communication system comprises wireless fidelity (WiFi) and the second communication system comprises light fidelity (LiFi).

8. The automated storage and retrieval system according to claim 1, wherein the at least one service vehicle comprises wheels which are guided for movement along the rail system in the X and Y directions.

9. The automated storage and retrieval system according to claim 1, wherein the at least one service vehicle comprises caterpillar tracks for movement over a top surface of the rail system independent of the X and Y directions of the rail system.

10. The automated storage and retrieval system according to claim 1, wherein an initial position of the at least one service vehicle is in a service area outside of the rail system where the plurality of remotely operated container handling vehicles operate.

11. The automated storage and retrieval system according to claim 1, wherein the rail system is at a top level of a storage grid.

12. The automated storage and retrieval system according to claim 1, wherein the rail system is a delivery rail system.

13. A method for handling malfunctioning vehicles on a rail system associated with a storage and retrieval system, wherein the storage and retrieval system comprises:
a plurality of remotely operated container handling vehicles configured to move laterally on the rail system;
a main control system using a first communication system for communicating with the plurality of remotely operated container handling vehicles wirelessly, wherein the main control system monitors and controls movement of the plurality of remotely operated container handling vehicles via the first communication system;
at least one service vehicle positioned at an initial position, wherein the at least one service vehicle is movable on the rail system, and wherein the at least one service vehicle is configured to bring a malfunctioning remotely operated container handling vehicle to a service area outside of the rail system where the plurality of remotely operated container handling vehicles operate;
a secondary control system, using a second communication system which is independent of the first communication system for communicating with the at least one service vehicle on the rail system wirelessly, and wherein the secondary control system monitors and controls the movement of the at least one service vehicle;
the main control system performs at least:
determining an anomaly in an operational condition of a remotely operated container handling vehicle on the rail system,
registering the remotely operated container handling vehicle with the anomalous operational condition as a malfunctioning remotely operated container handling vehicle,
registering a position of the malfunctioning remotely operated container handling vehicle relative to the rail system, and
setting up a two-dimensional exclusion zone extending from the malfunctioning remotely operated container handling vehicle to the position of the at least one service vehicle.

14. The method according to claim 13, wherein the method further comprises utilizing the main control system to:
update a movement pattern of the plurality of remotely operated container handling vehicles outside the two-dimensional exclusion zone such that entrance into the two-dimensional exclusion zone is avoided.

15. The method according to claim 14, wherein the method further comprises the secondary control system performing
operating the at least one service vehicle to move from the initial position to the position where the malfunctioning remotely operated container handling vehicle is halted along the two-dimensional exclusion zone.

16. A main control system for an automated storage and retrieval system, the automated storage and retrieval system comprising:
a rail system with horizontal tracks extending in perpendicular X and Y directions;
a plurality of remotely operated container handling vehicles configured to operate on the rail system;
at least one service vehicle; and
a secondary control system for the at least one service vehicle, wherein the secondary control system is communicating with the at least one service vehicle on the rail system such as to monitor and control movement of the at least one service vehicle, and wherein the at least one service vehicle is configured to bring a malfunctioning remotely operated container handling vehicle to a service area outside of the rail system where the plurality of remotely operated container handling vehicles operate,
wherein the main control system is configured to route the plurality of remotely operated container handling vehicles across a working zone of the rail system, the main control system further being configured to detect if a remotely operated container handling vehicle is malfunctioning, and if the remotely operated container handling vehicle is malfunctioning, the main control system being configured to:

reconfigure the working zone to divide off an exclusion zone, the exclusion zone defining an area of the rail system containing the malfunctioning remotely operated container handling vehicle and providing a path for the at least one service vehicle to reach the malfunctioning remotely operated container handling vehicle;

reroute other remotely operated container handling vehicles operating in the exclusion zone and in the reconfigured working zone so that they avoid the area of the rail system defined by the exclusion zone; and hand over control of the area of the rail system in the exclusion zone to the secondary control system.

17. The main control system according to claim 16, wherein the main control system is configured, once the at least one service vehicle has moved out of the exclusion zone of the rail system, to:

take back control of the area of the rail system within the exclusion zone from the secondary control system;

reconfigure the working zone to include the area of the rail system that was previously in the exclusion zone; and reroute remotely operated container handling vehicles to take account of the reconfigured working zone having the area of the rail system that was previously in the exclusion zone being included as part of the working zone.

* * * * *